(12) United States Patent
Zhang et al.

(10) Patent No.: US 12,439,061 B2
(45) Date of Patent: *Oct. 7, 2025

(54) SIGNIFICANT COEFFICIENT SIGNALING IN VIDEO CODING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,124

(22) Filed: Nov. 30, 2023

(65) Prior Publication Data

US 2024/0121411 A1    Apr. 11, 2024

Related U.S. Application Data

(63) Continuation of application No. 17/965,315, filed on Oct. 13, 2022, now Pat. No. 11,863,766, which is a
(Continued)

(51) Int. Cl.
*H04N 19/186*     (2014.01)
*H04N 19/119*     (2014.01)
(Continued)

(52) U.S. Cl.
CPC ......... *H04N 19/186* (2014.11); *H04N 19/119* (2014.11); *H04N 19/146* (2014.11);
(Continued)

(58) Field of Classification Search
CPC .................................................... H04N 19/186
See application file for complete search history.

(56) References Cited

U.S. PATENT DOCUMENTS

| 9,661,338 B2 | 5/2017 | Karczewicz |
| 10,764,576 B2 | 9/2020 | Li |
| (Continued) | | |

FOREIGN PATENT DOCUMENTS

| CN | 103190147 A | 7/2013 |
| CN | 103329529 A | 9/2013 |
| (Continued) | | |

OTHER PUBLICATIONS

Document: JVET-N1001-v1, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 350 pages.
(Continued)

*Primary Examiner* — Jerry T Jean Baptiste
(74) *Attorney, Agent, or Firm* — Conley Rose, P.C.

(57) ABSTRACT

An exemplary method for visual media processing includes performing a conversion between a current video block of a visual media data and a bitstream representation of the visual media data in accordance with a conditional signaling rule. The current video block is disabled from using an intra sub-block partitioning (ISP) split mode which divides the current video block into sub-blocks depending on dimensions of the current video block. In case that the conversion is associated with disabling use of the ISP split mode, the conditional signaling rule specifies selectively including in the bitstream representation a first syntax element indicating that a luma component of a sub-block of the current video block includes non-zero coefficient values. The selectively including is based at least on one or more other syntax elements having non-zero coefficient values of one or more
(Continued)

1400

Performing a conversion between a current video block of a visual media data and a bitstream representation of the visual media data in accordance with a conditional signalling rule, wherein the current video block is disabled from using an intra sub-block partitioning (ISP) split mode which divides the current video block vertically or horizontally into multiple sub-blocks depending on dimensions of the current video block, wherein, in a case that the conversion is associated with disabling use of the ISP split mode, the conditional signalling rule specifies selectively including in the bitstream representation a first syntax element indicating that a luma component of a sub-block of the current video block includes non-zero coefficient values, and further wherein the selectively including is based at least on one or more other syntax elements having non-zero coefficient values of one or more previous sub-blocks included in the bitstream representation

1402 previous sub-blocks included in the bitstream representation.

20 Claims, 13 Drawing Sheets

Related U.S. Application Data continuation of application No. 17/538,062, filed on Nov. 30, 2021, now Pat. No. 11,490,098, which is a continuation of application No. PCT/CN2020/095021, filed on Jun. 9, 2020.

(51) Int. Cl.
*H04N 19/146* (2014.01)
*H04N 19/157* (2014.01)
*H04N 19/176* (2014.01)
*H04N 19/593* (2014.01)
*H04N 19/70* (2014.01)

(52) U.S. Cl.
CPC ......... *H04N 19/157* (2014.11); *H04N 19/176* (2014.11); *H04N 19/593* (2014.11); *H04N 19/70* (2014.11)

(56) References Cited

U.S. PATENT DOCUMENTS

| | | | |
|---|---|---|---|
| 2004/0233989 A1* | 11/2004 | Kobayashi | H04N 19/593 375/E7.199 |
| 2005/0185937 A1* | 8/2005 | Comer | H04N 21/234327 386/334 |
| 2013/0016782 A1 | 1/2013 | Sasai | |
| 2013/0251026 A1 | 9/2013 | Guo | |
| 2015/0030067 A1 | 1/2015 | Zhao | |
| 2015/0245069 A1 | 8/2015 | Naito | |
| 2018/0262763 A1 | 9/2018 | Seregin | |
| 2018/0288437 A1 | 10/2018 | Hsiang | |
| 2018/0324463 A1 | 11/2018 | Zhang | |
| 2020/0359016 A1 | 11/2020 | Li | |
| 2020/0359017 A1 | 11/2020 | Li | |
| 2020/0359018 A1 | 11/2020 | Li | |
| 2021/0144407 A1* | 5/2021 | Lee | H04N 19/105 |

FOREIGN PATENT DOCUMENTS

| | | |
|---|---|---|
| CN | 104137545 A | 11/2014 |
| CN | 108141590 A | 6/2018 |
| WO | 2012087713 A1 | 6/2012 |
| WO | 2013107027 A1 | 7/2013 |
| WO | 2017209328 A1 | 12/2017 |
| WO | 2018045332 A1 | 3/2018 |
| WO | 2018177419 A1 | 10/2018 |
| WO | 2018190594 A1 | 10/2018 |

OTHER PUBLICATIONS

Document: JVET-N1001-v2, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 361 pages.

Document: JVET-N1001-v7, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 384 pages.

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13- 21, 2017, 50 pages.

Document: JVET-N0492-v4, Chernyak, R., et al., "CBF flags signalling in VVC," Joint Video Experts Team (JVET) of ITU-T SG 16 WP 3 and ISO/IEC JTC 1/SC 29/WG 11 14th Meeting: Geneva, CH, Mar. 19-27, 2019, 7 pages.

Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.

"Series H: Audiovisual and Multimedia Systems: Infrastructure of Audiovisual Services—Coding of Moving Video High efficiency video coding," ITU-T Telecommunication Standardization Sector of ITU, Recommendation H.265, Feb. 2018, 692 pages.

Document: JVET-N0054, Lainema, J., "CE7: Joint coding of chrominance residuals (CE7-1)," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

Foreign Communication From A Related Counterpart Application, PCT Application No. PCT/CN2020/095021, English Translation of International Search Report dated Sep. 23, 2020, 9 pages.

Non-Final Office Action dated Mar. 3, 2022, 18 pages, U.S. Appl. No. 17/538,062, filed Nov. 30, 2021.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v5, 374 Pages.

ITU-T: "Series H: Audiovisual and Multimedia Systems, Infrastructure of Audiovisual Services—Coding of Moving Video, High Efficiency Video Coding," Recommendation ITU-T H.265 (V9) | ISO/IEC 23008-2 (in Force Edition), Sep. 2023, 718 Pages.

* cited by examiner

SIGNIFICANT COEFFICIENT SIGNALING IN VIDEO CODING

CROSS REFERENCE TO RELATED APPLICATIONS

This application is a continuation of U.S. application Ser. No. 17/965,315, filed on Oct. 13, 2022, which is a continuation of U.S. application Ser. No. 17/538,062, filed on Nov. 30, 2021, now U.S. Pat. No. 11,490,098, which is a continuation of International Application No. PCT/CN2020/095021, filed on Jun. 9, 2020, which claims the priority to and benefits of International Patent Application No. PCT/CN2019/090455, filed on Jun. 9, 2019. All of the aforementioned patent applications are hereby incorporated by reference in their entireties.

TECHNICAL FIELD

The present disclosure relates to image and video coding/decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to the signaling of significant coefficients for video coding. The described methods may be applied to both the existing video coding standards (e.g., High Efficiency Video Coding (HEVC)) and future video coding standards or video codecs.

In one representative aspect, the disclosed technology may be used to provide a method for visual media processing. This method includes performing a conversion between a current video block of a visual media data and a bitstream representation of the visual media data in accordance with a conditional signaling rule, wherein the current video block is disabled from using an intra sub-block partitioning (ISP) split mode which divides the current video block vertically or horizontally into multiple sub-blocks depending on dimensions of the current video block, wherein, in a case that the conversion is associated with disabling use of the ISP split mode, the conditional signaling rule specifies selectively including in the bitstream representation a first syntax element indicating that a luma component of a sub-block of the current video block includes non-zero coefficient values, and further wherein the selectively including is based at least on one or more other syntax elements having non-zero coefficient values of one or more previous sub-blocks included in the bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

In yet another representative aspect, a video encoder apparatus may implement a method as described herein.

The above and other aspects and features of the disclosed technology are described in greater detail in the drawings, the description and the claims.

DETAILED DESCRIPTION

Figure 1:
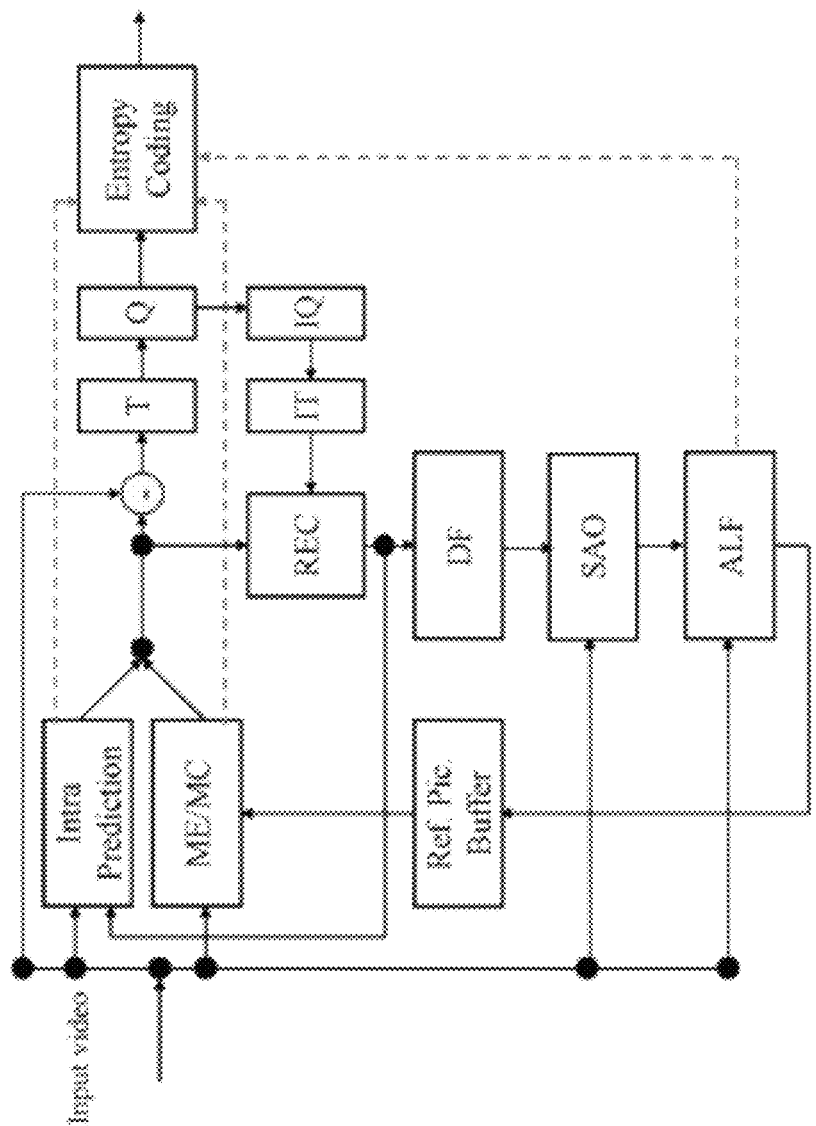
FIG. 1 shows a block diagram of an example encoder.

Embodiments of the disclosed technology may be applied to existing video coding standards (e.g., HEVC, H.265) and future standards to improve compression performance Section headings are used in the present disclosure to improve readability of the description and do not in any way limit the discussion or the embodiments (and/or implementations) to the respective sections only.

1. Summary

This disclosure is related to video coding technologies. Specifically, it is related to coefficient coding in a transform skip mode in video coding. It may be applied to the existing video coding standard like HEVC, or the standard Versatile Video Coding (VVC) to be finalized. It may be also applicable to future video coding standards or video codec.

2. Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Moving Picture Experts Group (MPEG)-H Part 2), the Versatile Video Coding (VVC) standard to be finalized, or other current and/or future video coding standards.

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC1) SC29/WG11 (MPEG) was created to work on the VVC standard targeting at 50% bitrate reduction compared to HEVC.

2.1 Coding Flow of a Typical Video Codec

FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2 Intra Coding in VVC 2.2.1 Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 2, and the planar and direct current (DC) modes remain the same. These denser directional intra prediction modes apply for all block sizes and for both luma and chroma intra predictions.

Figure 2:
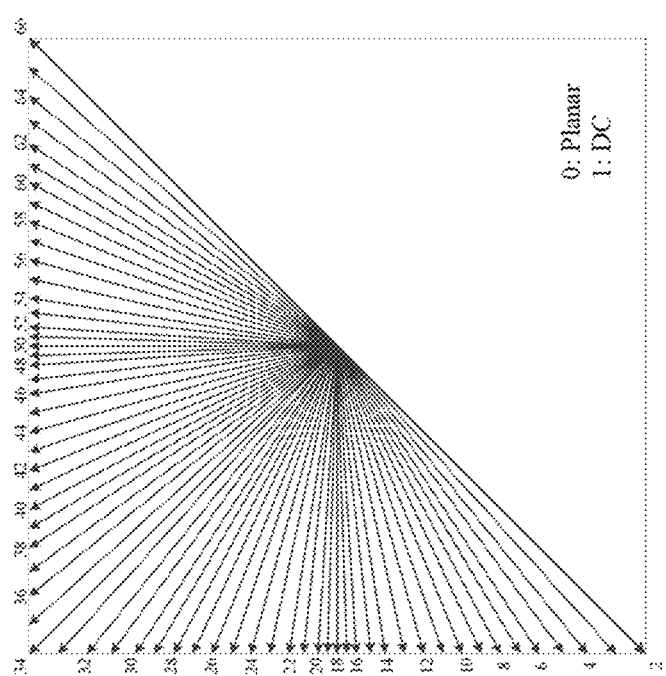
FIG. 2 shows an example of 67 intra prediction modes.

Conventional angular intra prediction directions are defined from 45 degrees to −135 degrees in clockwise direction as shown in FIG. 2. In VVC test model (VTM)2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signalling: planar, DC, horizontal, vertical, bottom-left angular mode and its eight adjacent angular modes, and top-right angular mode and its eight adjacent angular modes.

2.2.2 Intra Sub-Block Partitioning (ISP)

Figure 3:
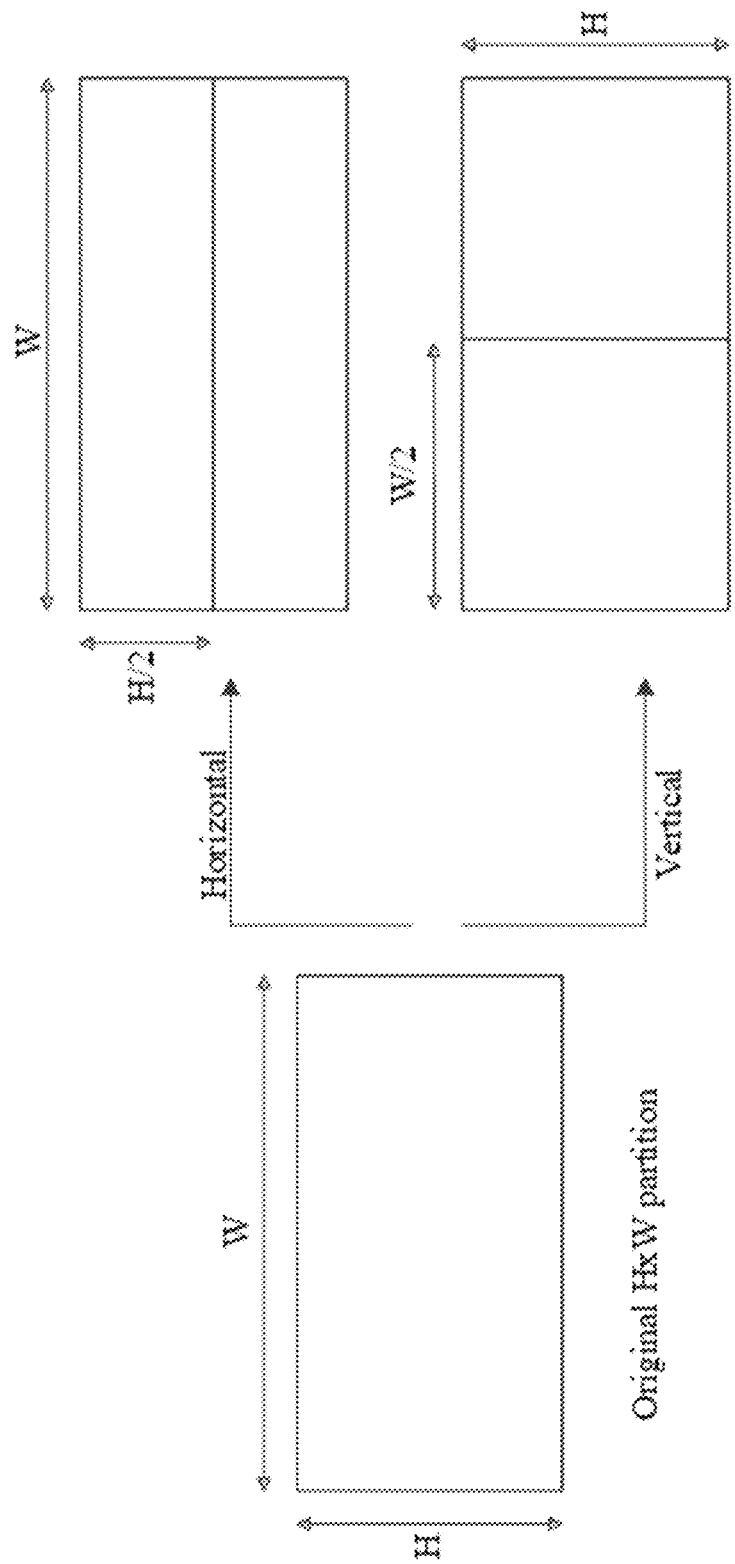
FIG. 3 shows an example of divisions of 4×8 and 8×4 blocks.
Figure 4:
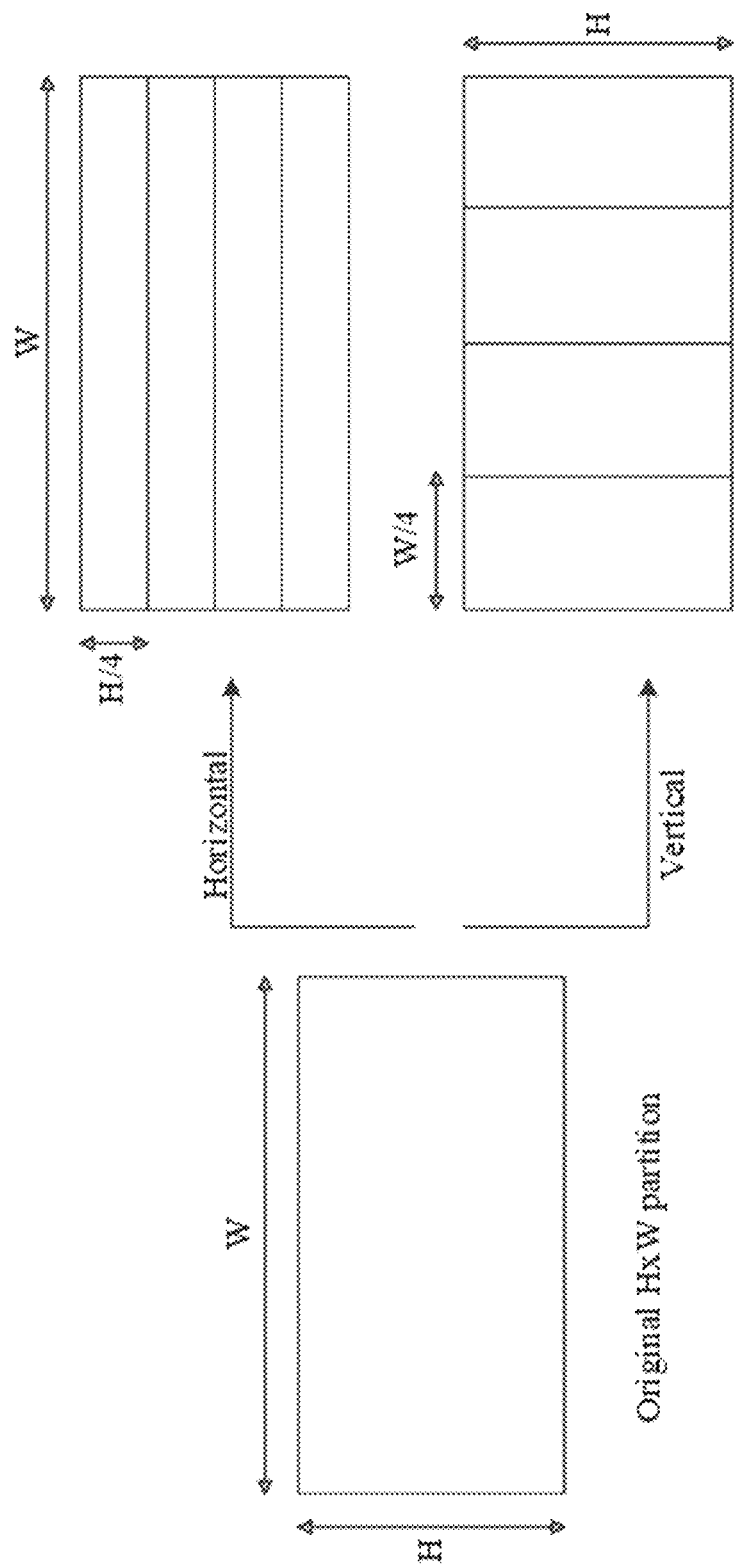
FIG. 4 shows an example of divisions all blocks except 4×8, 8×4 and 4×4.
Figure 5:
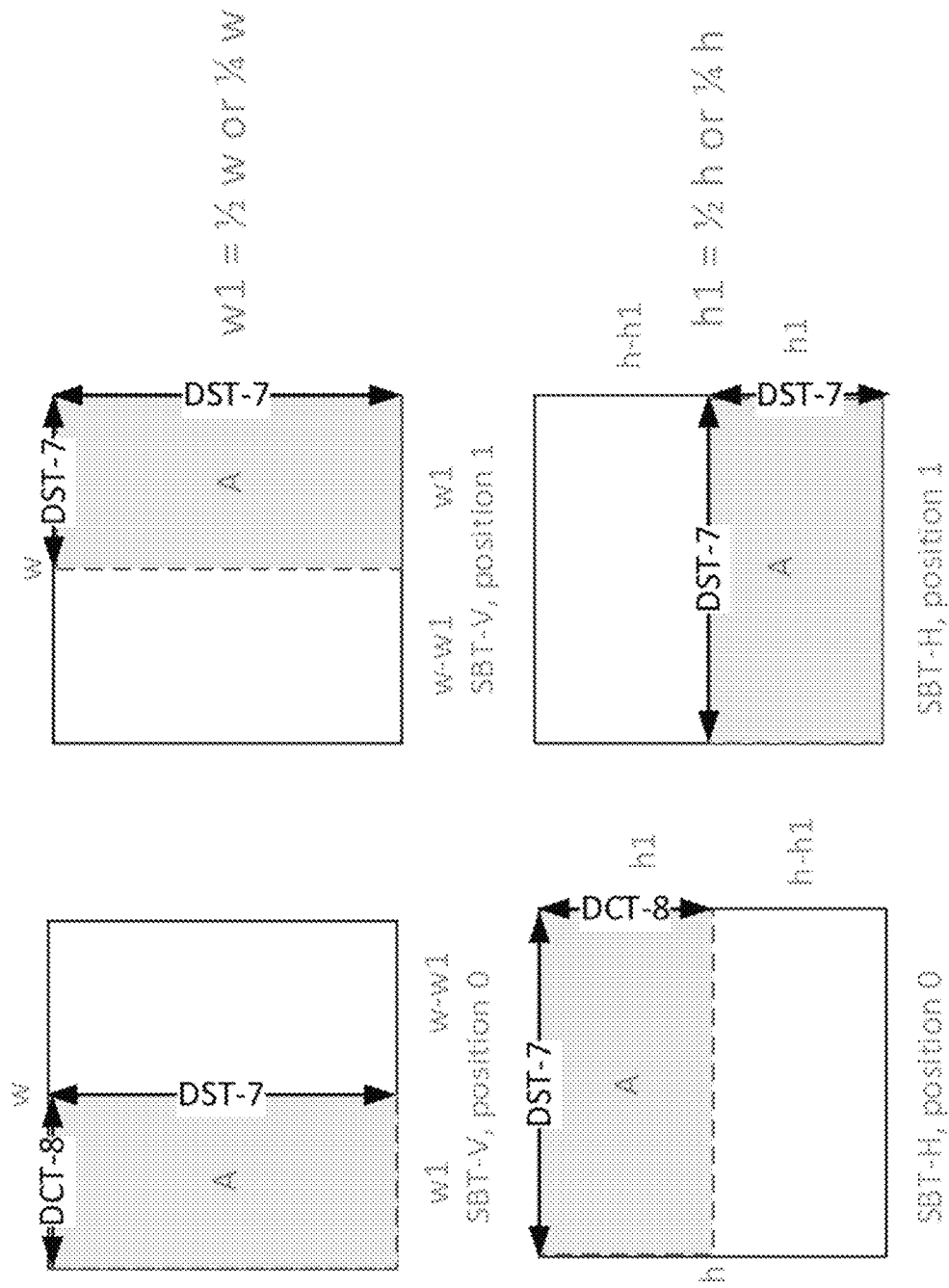
FIG. 5 shows an example of sub-block transform modes sub-block transform vertical (SBT-V) and sub-block transform horizontal (SBT-H).

In JVET-M0102, ISP is proposed, which divides luma intra-predicted blocks vertically or horizontally into 2 or 4 sub-partitions depending on the block size dimensions, as shown in Table 1. FIG. 3 and FIG. 4 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size
(denoted maximum transform size by maxTBSize)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signalled | If neither 4 × 8 nor 8 × 4, and W <= maxTBSize and H <= maxTB Size | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16) ? DST-VII: DCT-II | (nTbH >= 4 && nTbH <= 16) ? DST-VII: DCT-II |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16) ? DST-VII: DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | DCT-II | (nTbH >= 4 && nTbH <= 16 ) ? DST-VII: DCT-II |

2.2.2.1 Syntax and Semantics
7.3.7.5 Coding Unit Syntax

|  | Descriptor |
|---|---|
| coding unit( x0, y0, cbWidth, cbHeight, treeType ) { | |
|   if( slice_type != I | | sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) | | | |
|       ( slice_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE | | treeType = = DUAL_TREE_LUMA ) { | |
|         if( ( y0 % CtbSizeY ) > 0 ) | |
|           intra_luma_ref_idx[ x0 ][ y0 ] | ae(v) |
|         <u>if (intra_luma_ref_idx[ x0 ][ y0 ] = = 0 &&</u> | |
|         <u>( cbWidth <= MaxTbSizeY | | cbHeight <=</u> | |
| <u>MaxTbSizeY ) &&</u> | |
|         <u>( cbWidth * cbHeight ></u> | |
| <u>MinTbSizeY * MinTbSizeY ))</u> | |
|           <u>intra_subpartitions_mode_flag[ x0 ][ y0 ]</u> | <u>ae(v)</u> |
|         <u>if(intra_subpartitions_mode_flag[ x0 ][ y0 ] = = 1 &&</u> | |
|         <u>cbWidth <= MaxTbSizeY && cbHeight <=</u> | |
| <u>MaxTbSizeY )</u> | |
|           <u>intra_subpartitions_split_flag[ x0 ][ y0 ]</u> | <u>ae(v)</u> |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |

|  | Descriptor |
|---|---|
|       else | |
|          intra_luma_mpm_remainder[ x0 ][ y0 ] | ae(v) |
|     } | |
|     if( treeType = = SINGLE_TREE \|\| treeType = = DUAL_TREE_CHROMA ) | |
|        intra_chroma_pred_mode[ x0 ][ y0 ] | ae(v) |
|   } | |
| } else if( treeType != DUAL_TREE_CHROMA ) { /* MODE_INTER or MODE_IBC */ | |
| ... | |
|   } | |
| ... | |
| } | | intra_subpartitions_modeflag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_splitilag[x0][y0] specifies whether the intra subpartitions split type is horizontal or vertical. When intra_subpartitions_split_flag[x0][y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 7-9. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1 +intra_subpartitions_split_flag[x0][y0].

TABLE 7-9

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:

cbWidth is equal to 4 and cbHeight is equal to 8, cbWidth is equal to 8 and cbHeight is equal to 4.

Otherwise, NumIntraSubPartitions is set equal to 4.

2.3 Chroma Intra Mode Coding

For chroma intra mode coding, a total of 8 or 5 intra modes are allowed for chroma intra mode coding depending on whether cross-component linear model (CCLM) is enabled or not. Those modes include five traditional intra modes and three cross-component linear model modes. Chroma DM mode use the corresponding luma intra prediction mode. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 8-2

Specification of IntraPredModeC[ xCb ][ yCb ] depending on intra_chroma_pred_mode[ xCb ][ yCb ] and IntraPredModeY[ xCb + cbWidth / 2 ][ yCb + cbHeight / 2 ] when sps_cclm_enabled_flag is equal to 0

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 (DM) | 0 | 50 | 18 | 1 | X |

TABLE 8-3

Specification of IntraPredModeC[ xCb ][ yCb ] depending on
intra_chroma_pred_mode[ xCb ][ yCb ] and
IntraPredModeY[ xCb + cbWidth / 2 ][ yCb + cbHeight / 2 ]
when sps_cclm_enabled_flag is equal to 1

| intra_chroma_pred_mode[ xCb ][ yCb ] | IntraPredModeY[ xCb + cbWidth / 2 ][ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 (DM) | 0 | 50 | 18 | 1 | X |

2.4 Transform Coding in VVC 2.4.1 Sub-Block Transform

For an inter-predicted CU with cu_cbf equal to 1, cu_sbt_flag may be signaled to indicate whether the whole residual block or a sub-part of the residual block is decoded. In the former case, inter MPEG Transport Stream (MTS) information is further parsed to determine the transform type of the coding unit (CU). In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma transform block (TB) always using discrete cosine transform (DCT)-2). The two positions of SBT-H and SBT-V are associated with different core transforms. More specifically, the horizontal and vertical transforms for each SBT position is specified in FIG. 3. For example, the horizontal and vertical transforms for SBT-V position 0 is DCT-8 and discrete sine transform (DST)-7, respectively. When one side of the residual transform unit (TU) is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.4.1.1 Syntax Elements 7.3.7.5 Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \|\| | |
|       ( slice_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|   ... | |
|   } else if( treeType != DUAL_TREE_CHROMA ) { /* MODE_INTER or MODE_ IBC */ | |
|   ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       *if( CuPredMode[x0 ][y0 ]= = MODE_INTRA && sps_sbt_enabled_flag &&* | |
|       *!ciip_flag[x0 ][y0 ])* | |
|       *if( cbWidth <= MaxSbtSize && cbHeight <= MaxSbtSize ){* | |
|         *allowSbtVerH = cbWidth >= 8* | |
|         *allowSbtVerQ = cbWidth >= 16* | |
|         *allowSbtHorH = cbHeight >= 8* | |
|         *allowSbtHorQ = cbHeight >= 16* | |
|         *if( allowSbtVerH \|\| allowSbtHorH \|\| allowSbtVerQ \|\| allowSbtHorQ )* | |
|           *cu_sbt_flag{* | *ae(v)* |
|       *}* | |
|       *if(cu_sbt_flag)* | |
|         *if( ( allowSbtVerH \|\| allowSbtHorH ) && ( allowSbtVerQ \|\| allowSbtHorQ )* | *ae(v)* |
|           *cu_sbt_quad_flag* | |
|         *if( ( cu_sbt_quad_flag && allowSbtVerQ && allowSbtHorQ ) \|\|* | *ae(v)* |
|           *( !cu_sbt_quad_flag && allowSbtVerH && allowSbtHorH ) )* | *ae(v)* |
|         *cu_sbt_horizontal_flag* | |
|         *cu_sbt_pos_flag* | |

|  | Descriptor |
|---|---|
| ⋮ |  |
|     ⋮ |  |
|         transform_tree( x0, y0, cbWidth, cbHeight, treeType ) |  |
|         } |  |
|     } |  |
| } |  | cu_sbt_flag equal to 1 specifies that for the current coding unit, subblock transform is used. cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad_flag is not present, its value is inferred to be equal to 0.

cu_sbt_horizontal_flag equal to 1 specifies that the current coding unit is split horizontally into 2 transform units. cu_sbt_horizontal_flag x[x0][y0] equal to 0 specifies that the current coding unit is split vertically into 2 transform units.

When cu_sbt_horizontal_flag is not present, its value is derived as follows:

If cu_sbt_quad_flag is equal to 1, cu_sbt_horizontal_flag is set to be equal to allowSbtHorQ.

Otherwise (cu_sbt_quad_flag is equal to 0), cu_sbt_horizontal_flag is set to be equal to allowSbtHorH.

cu_sbt_pos_flag equal to 1 specifies that the tu_cbf luma, tu_cbf_cb and tu_cbf_cr of the first transform unit in the current coding unit are not present in the bitstream. cu_sbt_pos_flag equal to 0 specifies that the tu_cbf luma, tu_cbf_cb and tu_cbf_cr of the second transform unit in the current coding unit are not present in the bitstream.

The variable SbtNumFourthsTb0 is derived as follows:

$$sbtMinNumFourths = cu\_sbt\_quad\_flag\,?\,1:2 \quad (7\text{-}117)$$

$$SbtNumFourthsTb0 = cu\_sbt\_pos\_flag\,?\,(4-sbtMinNumFourths):sbtMinNumFourths \quad (7\text{-}118)$$

sps_sbt_max_size_64_flag equal to 0 specifies that the maximum CU width and height for allowing subblock transform is 32 luma samples, sps_sbt_max_size_64_flag equal to 1 specifies that the maximum CU width and height for allowing subblock transform is 64 luma samples.

$$MaxSbtSize = sps\_sbt\_max\_size\_64\_flag\,?\,64:32 \quad (7\text{-}33)$$

2.5 Entropy Coding of Coefficients

2.5.1 Coefficients Coding of Transform-Applied Blocks

In HEVC, transform coefficients of a coding block are coded using non-overlapped coefficient groups (CGs) (or subblocks), and each CG contains the coefficients of a 4×4 block of a coding block. The CGs inside a coding block, and the transform coefficients within a CG, are coded according to pre-defined scan orders.

Figure 6:
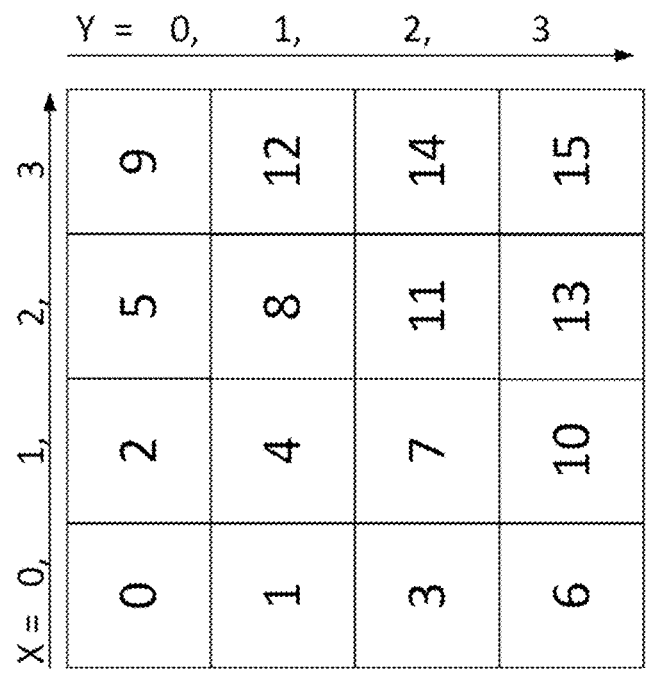
FIG. 6 shows an example of a diagonal up-right scan order for a 4×4 coding group.
Figure 6:
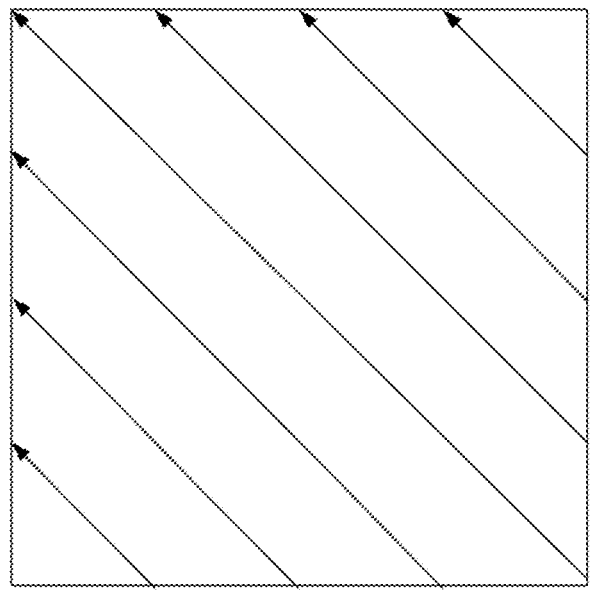
Figure 7:
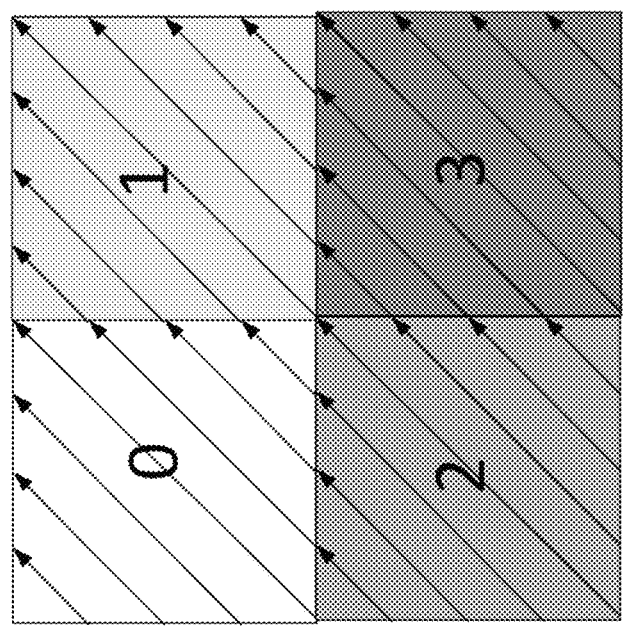
FIG. 7 shows an example of a diagonal up-right scan order for an 8×8 block with coding groups of size 4×4.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 6 and FIG. 7, respectively.

Note that the coding order is the reversed scanning order (i.e., decoding from CG3 to CG0 in FIG. 7), when decoding one block, the last non-zero coefficient's coordinate is firstly decoded.

The coding of transform coefficient levels of a CG with at least one non-zero transform coefficient may be separated into multiple scan passes. In the first pass, the first bin (denoted by bin0, also referred as significant_coeff flag, which indicates the magnitude of the coefficient is larger than 0) is coded. Next, two scan passes for context coding the second/third bins (denoted by bin1 and bin2, respectively, also referred as coeff_abs_greater1_flag and coeff_abs_greater2_flag) may be applied. Finally, two more scan passes for coding the sign information and the remaining values (also referred as coeff_abs_level_remaining) of coefficient levels are invoked, if necessary. Note that only bins in the first three scan passes are coded in a regular mode and those bins are termed regular bins in the following descriptions.

In the VVC 3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).

Pass 2: coding of remaining absolute level (remainder) is processed for all scan positions with gt2_flag equal to 1 or gt1_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) for all scan positions with sig_coeff flag equal to 1

It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), codeValue is set equal to absLevel[k].

The value of codeValue is coded using a Golomb-Rice code with Rice parameter ricePar.

2.5.1.1 Context Modeling for Coefficient Coding

Figure 8:
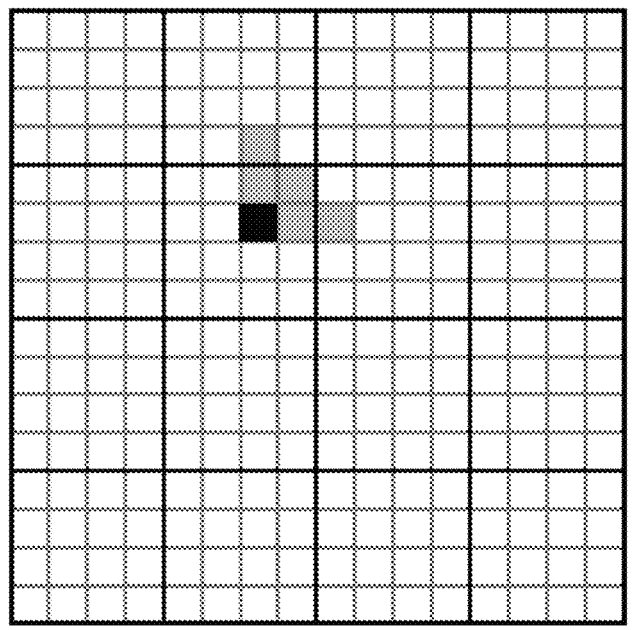
FIG. 8 shows an example of a template used to select probability models.

The selection of probability models for the syntax elements related to absolute values of transform coefficient levels depends on the values of the absolute levels or partially reconstructed absolute levels in a local neighbourhood. The template used is illustrated in FIG. 8.

The selected probability models depend on the sum of the absolute levels (or partially reconstructed absolute levels) in a local neighborhood and the number of absolute levels greater than 0 (given by the number of sig_coeff flags equal to 1) in the local neighborhood. The context modelling and binarization depends on the following measures for the local neighborhood:

numSig: the number of non-zero levels in the local neighborhood;

sumAbs1: the sum of partially reconstructed absolute levels (absLevel1) after the first pass in the local neighborhood;

sumAbs: the sum of reconstructed absolute levels in the local neighborhood diagonal position (d): the sum of the horizontal and vertical coordinates of a current scan position inside the transform block Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

2.5.1.2 Dependent Quantization (DQ)

In addition, the same HEVC scalar quantization is used with a new concept called dependent scale quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 9:
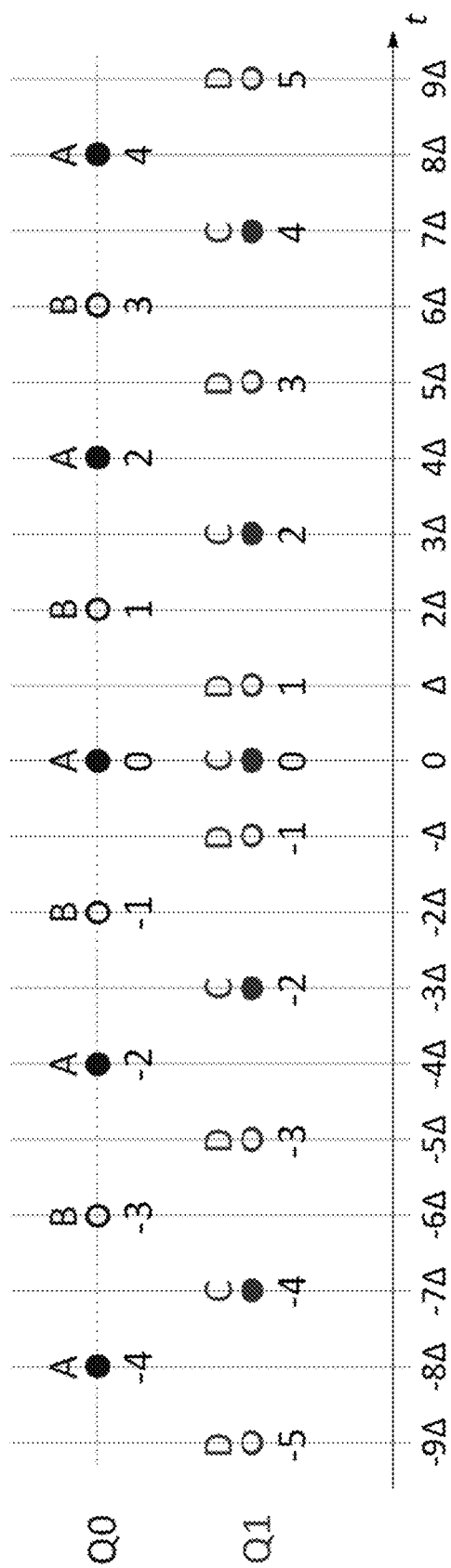
FIG. 9 shows an example of two scalar quantizers used for dependent quantization.

The two scalar quantizers used, denoted by Q0 and Q1, are illustrated in FIG. 9. The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 10:
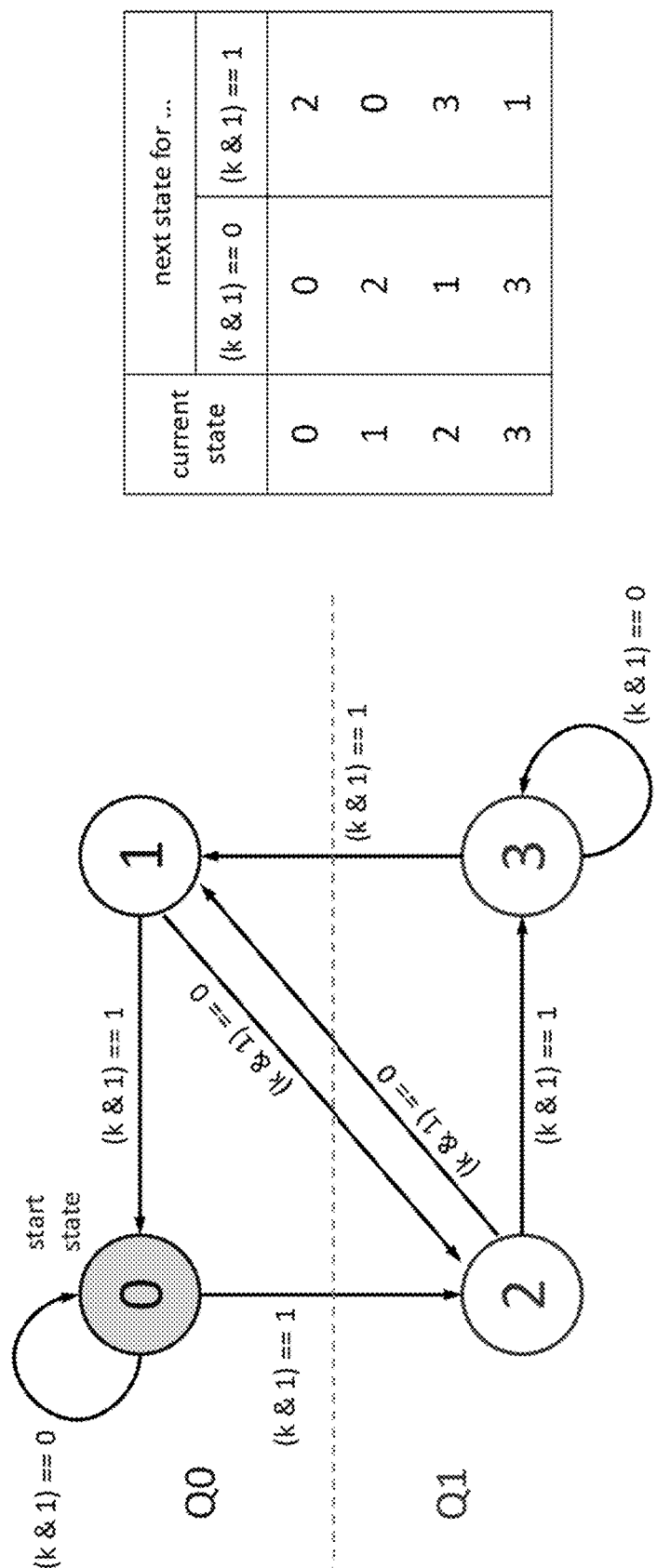
FIG. 10 shows an example of a state transition and quantizer selection for the proposed dependent quantization process.

As illustrated in FIG. 10, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 10, where k denotes the value of the transform coefficient level.

2.5.1.3 Syntax and Semantics 7.3.7.11 Residual Coding Syntax

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2TbWidth = 4 | |
|   else | |
|     log2TbWidth = Min( log2TbWidth, 5 ) | |
|   if( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbHeight > 4 ) | |
|     log2TbHeight = 4 | |
|   else | |
|     log2TbHeight = Min( log2TbHeight, 5 ) | |
|   if( log2TbWidth > 0 ) | |
|     last_sig_coeff_x_prefix | ae(v) |
|   if( log2TbHeight > 0 ) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |

| | Descriptor |
|---|---|
| last_sig_coeff_y_suffix | ae(v) |

```
log2SbW = ( Min( log2TbWidth, log2TbHeight ) < 2 ? 1 : 2 )
log2SbH = log2SbW
if ( log2TbWidth < 2 && cIdx = = 0 ) {
  log2SbW = log2TbWidth
  log2SbH = 4 – log2SbW
} else if ( log2TbHeight < 2 && cIdx = = 0 ) {
  log2SbH = log2TbHeight
  log2SbW = 4 – log2SbH
}
numSbCoeff = 1 << ( log2SbW + log2SbH )
lastScanPos = numSbCoeff
lastSubBlock = ( 1 << ( log2TbWidth + log2TbHeight – ( log2SbW + log2SbH ) ) ) – 1
do {
  if( lastScanPos = = 0 ) {
      lastScanPos = numSbCoeff
      lastSubBlock– –
  }
  lastScanPos– –
  xS = DiagScanOrder[ log2TbWidth – log2SbW ][ log2TbHeight – log2SbH ]
              [ lastSubBlock ][ 0 ]
  yS = DiagScanOrder[ log2TbWidth – log2SbW ][ log2TbHeight – log2SbH ]
              [ lastSubBlock ][ 1 ]
  xC = ( xS << log2SbW ) + DiagScanOrder[ log2SbW ][ log2SbH ][ lastScanPos ][ 0 ]
  yC = ( yS << log2SbH ) + DiagScanOrder[ log2SbW ][ log2SbH ][ lastScanPos ][ 1 ]
} while( ( xC != LastSignificantCoeffX ) | | (yC != LastSignificantCoeffY ) )
QState = 0
for( i = lastSubBlock; i >= 0; i– – ) {
  startQStateSb = QState
  xS = DiagScanOrder[ log2TbWidth – log2SbW ][ log2TbHeight – log2SbH ]
              [ lastSubBlock ][ 0 ]
  yS = DiagScanOrder[ log2TbWidth – log2SbW ][ log2TbHeight – log2SbH ]
              [ lastSubBlock ][ 1 ]
  inferSbDcSigCoeffFlag = 0
  if( ( i < lastSubBlock ) && ( i > 0 ) ) {
```

| | |
|---|---|
|     coded_sub_block_flag[ xS ][ yS ] | ae(v) |

```
      inferSbDcSigCoeffFlag = 1
  }
  firstSigScanPosSb = numSbCoeff
  lastSigScanPosSb = –1
  remBinsPass1 = ( ( log2SbW + log2SbH ) < 4 ? 8 : 32 )
  firstPosMode0 = ( i = = lastSubBlock ? lastScanPos : numSbCoeff – 1 )
  firstPosMode1 = –1
  for( n = firstPosMode0; n >= 0 && remBinsPass1 >= 4; n– – ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( coded_sub_block_flag[ xS ][ yS ] && ( n > 0 | | !inferSbDcSigCoeffFlag ) &&
          ( xC != LastSignificantCoeffX | | yC != Last SignificantCoeffY ) ) {
```

| | |
|---|---|
|     sig_coeff_flag[ xC ][ yC ] | ae(v) |

```
          remBinsPass 1– –
          if( sig_coeff_flag[ xC ][ yC ] )
              inferSbDcSigCoeffFlag = 0
      }
      if( sig_coeff_flag[ xC ][ yC ] ) {
```

| | |
|---|---|
|     abs_level_gt1_flag[ n ] | ae(v) |

```
          remBinsPass1– –
          if( abs_level_gt1_flag[ n ] ) {
```

| | |
|---|---|
|     par_level_flag[ n ] | ae(v) |

```
              remBinsPass1– –
```

| | |
|---|---|
|     abs_level_gt3_flag[ n ] | ae(v) |

```
              remBinsPass1– –
          }
          if( lastSigScanPosSb = = –1 )
              lastSigScanPosSb = n
          firstSigScanPosSb = n
      }
      AbsLevelPass1[ xC ][ yC ] = sig_coeff_flag[ xC ][ yC ] + par_level_flag[ n ] +
abs_level_gt1_flag[ n ] + 2 * abs_level_gt3_flag[ n ]
      if( dep_quant_enabled_flag )
          QState = QStateTransTable[ QState ][ AbsLevelPass1[ xC ][ yC ] & 1 ]
      if( remBinsPass1 < 4 )
          firstPosMode1 = n – 1
  }
  for( n = numSbCoeff – 1; n >= firstPosMode1; n– – ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( abs_level_gt3_flag[ n ] )
```

-continued

| | Descriptor |
|---|---|
|     abs_remainder[ n ]<br>    AbsLevel[ xC ][ yC ] = AbsLevelPass1[ xC ][ yC ] +2 * abs_remainder[ n ]<br>  }<br>  for( n = firstPosMode1; n >= 0; n- - ) {<br>    xC = ( xS << log2SbW ) + DiagScanOrder[ log2SbW ][ log2SbH ][ n ][ 0 ]<br>    yC = ( yS << log2SbH ) + DiagScanOrder[ log2SbW ][ log2SbH ][ n ][ 1 ]<br>    dec_abs_level[ n ]<br>    if(AbsLevel[ xC ][ yC ] > 0 )<br>      firstSigScanPosSb = n<br>    if( dep_quant_enabled_flag )<br>      QState = QStateTransTable[ QState ][ AbsLevel[ xC ][ yC ] & 1 ]<br>  }<br>  if( dep_quant_enabled_flag \|\| !sign_data_hiding_enabled_flag )<br>    signHidden = 0<br>  else<br>    signHidden = ( lastSigScanPosSb − firstSigScanPosSb > 3 ? 1 : 0 )<br>  for( n = numSbCoeff − 1; n >= 0; n- - ) {<br>    xC = ( xS << log2SbW ) + DiagScanOrder[ log2SbW ][ log2SbH ][ n ][ 0 ]<br>    yC = ( yS << log2SbH ) + DiagScanOrder[ log2SbW ][ log2SbH ][ n ][ 1 ]<br>    if( ( AbsLevel[ xC ][ yC ] > 0 ) &&<br>      ( !signHidden \|\| ( n != firstSigScanPosSb ) ) )<br>      coeff_sign_flag[ n ]<br>  }<br>  if( dep_quant_enabled_flag ) {<br>    QState = startQStateSb<br>    for( n = numSbCoeff − 1; n >= 0; n- - ) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if( AbsLevel[ xC ][ yC ] > 0 )<br>        TransCoeffLevel[ x0 ][ y0 ][ cIdx][ xC ][ yC ] =<br>          ( 2 * AbsLevel[ xC ][ yC ] − ( QState > 1 ? 1 : 0 ) ) *<br>          ( 1 − 2 * coeff_sign_flag[ n ] )<br>      QState = QStateTransTable[ QState ][ par_level_flag[ n ] ]<br>    }<br>  } else {<br>    sumAbsLevel = 0<br>    for( n = numSbCoeff − 1; n >= 0; n- - ) {<br>      xC = ( xS << log2SbW ) + DiagScanOrder[ log2SbW ][ log2SbH ][ n ][ 0 ]<br>      yC = ( yS << log2SbH ) + DiagScanOrder[ log2SbW ][ log2SbH ][ n ][ 1 ]<br>      if( AbsLevel[ xC ][ yC ] > 0 ) {<br>        TransCoeffLevel[ x0 ][ y0 ][ cIdx][ xC ][ yC ] =<br>          AbsLevel[ xC ][ yC ] * ( 1 − 2 * coeff_sign_flag[ n ] )<br>        if( signHidden ) {<br>          sumAbsLevel += AbsLevel[ xC ][ yC ]<br>          if( ( n == firstSigScanPosSb ) && ( sumAbsLevel % 2) == 1 ) )<br>  TransCoeffLevel[ x0 ][ y0 ][ cIdx][ xC ][ yC ] =<br>  −TransCoeffLevel[ x0 ][ y0 ][ cIdx ][ xC ][ yC ]<br>        }<br>      }<br>    }<br>  }<br>}<br>} | ae(v)<br><br><br><br><br>ae(v)<br><br><br><br><br><br><br><br><br><br>ae(v) |

2.5.2 JVET-N0492

This contribution proposes a modification of VVC 4 specification and VTM 4.0.1 software (SW) aimed to remove inconsistency in part of coded block flag (CBF) flags signalling between them. The contribution consists of two aspects. The first aspect proposes to remove hierarchical chroma CBF signalling based on Transform Unit depth from the VTM SW, which is not presented in the specification; and include to the specification missing luma cbf flag deriving methods for normal TU and SBT TU based on chroma CBF flags, which is presented in the SW. The second aspect is proposed on top of the first and assumes unified design of all existing luma cbf flag deriving methods. Both aspects provide negligible coding performance difference in respect to VTM 4.0.1.

This contribution includes two aspects.

In the first aspect, both SW and specification modifications are proposed. Concerning the SW, it is proposed to remove from the hierarchical chroma CBFs signalling based on Transform Unit depth, which was inherited to VTM from NEXT/JEM times. Concerning the specification, it is proposed to include the luma cbf flag deriving method based on two chroma cbf flags.

2.6 Aspect 1

There are four possibilities of TU representing in VVC 4:
1. Normal TU equals to CU size (no split);
2. SBT TUs partitioning;
3. ISP TUs partitioning;
4. TUs partitioning caused by maximal transform size restriction.

Following tables demonstrates these possibilities.

TABLE 3

VVC 4 transform_tree syntax table

| | Descriptor |
|---|---|
| transform_tree( x0, y0, tbWidth, tbHeight, treeType) {<br>  InferTuCbfLuma = 1<br>  if( IntraSubPartSplitType = = NO_ISP_SPLIT ) {<br>    if( tbWidth > MaxTbSizeY \|\| tbHeight > MaxTbSizeY ) {<br>      trafoWidth = ( tbWidth > MaxTbSizeY ) ? (tbWidth / 2) : tbWidth<br>      trafoHeight = ( tbHeight > MaxTbSizeY ) ? (tbHeight / 2) : tbHeight<br>      transform_tree( x0, y0, trafoWidth, trafoHeight )<br>      if( tbWidth > MaxTbSizeY )<br>    transform_tree( x0 + trafoWidth, y0, trafoWidth, trafoHeight, treeType )<br>      if( tbHeight > MaxTbSizeY )<br>    transform_tree( x0, y0 + trafoHeight, trafoWidth, trafoHeight, treeType )<br>      if( tbWidth > MaxTbSizeY && tbHeight > MaxTbSizeY )<br>    transform_tree( x0 + trafoWidth, y0 + trafoHeight, trafoWidth, trafoHeight, treeType )<br>    } else {<br>      transform_unit( x0, y0, tbWidth, tbHeight, treeType, 0 )<br>    }<br>  } else if( cu_sbt_flag ) {<br>    if( !cu_sbt_horizontal_flag ) {<br>      trafoWidth = tbWidth * SbtNumFourthsTb0 / 4<br>      transform_unit( x0, y0, trafoWidth, tbHeight, treeType, 0 )<br>  transform_unit( x0 + trafoWidth, y0, tbWidth – trafoWidth, tbHeight, treeType, 1 )<br>    } else {<br>      trafoHeight = tbHeight * SbtNumFourthsTb0 / 4<br>      transform_unit( x0, y0, tbWidth, trafoHeight, treeType, 0 )<br>  transform_unit( x0, y0 + trafoHeight, tbWidth, tbHeight – trafoHeight, treeType, 1 )<br>    }<br>  } else if( IntraSubPartitionsSplitType = = ISP_HOR_SPLIT ) {<br>    trafoHeight = tbHeight / NumIntraSubPartitions<br>    for( partIdx = 0; partIdx < NumIntraSubPartitions; partIdx++ )<br>  transform_unit( x0, y0 + trafoHeight * partIdx, tbWidth, trafoHeight, treeType, partIdx )<br>  } else if( IntraSubPartitionsSplitType = = ISP_VER_SPLIT ) {<br>    trafoWidth = tbWidth / NumIntraSubPartitions<br>    for( partIdx = 0; partIdx < NumIntraSubPartitions; partIdx++ )<br>  transform_unit( x0 + trafoWidth * partIdx, y0, trafoWidth, tbHeight, treeType, partIdx )<br>  }<br>} | |

TABLE 3

VVC 4 transform_unit syntax table

| | Descriptor |
|---|---|
| transform_unit( x0, y0, tbWidth, tbHeight, treeType, subTuIndex ) {<br>  if( treeType = = SINGLE_TREE \| \| treeType = = DUAL_TREE_LUMA ) {<br>    if( ( IntraSubPartitionsSplitType = = ISP_NO_SPLIT && !( cu_sbt_flag &&<br>        ( ( subTuIndex = = 0 && cu_sbt_pos_flag ) \| \|<br>          ( subTuIndex = = 1 && !cu_sbt_pos_flag ) ) ) ) \| \|<br>      ( IntraSubPartitionsSplitType != ISP_NO_SPLIT &&<br>      ( subTuIndex < NumIntraSubPartitions – 1 \| \| !InferTuCbfLuma ) ) )<br>      tu_cbf_luma[ x0 ][ y0 ] | ae(v) |
|     if (IntraSubPartitionsSplitType != ISP_NO_SPLIT )<br>      InferTuCbfLuma = InferTuCbfLuma && !tu_cbf_luma[ x0 ][ y0 ]<br>  }<br>  if( ( treeType = = SINGLE_TREE \| \| treeType = = DUAL_TREE_CHROMA ) {<br>    if( ( IntraSubPartitionsSplitType = = ISP_NO_SPLIT && !( cu_sbt_flag &&<br>        ( ( subTuIndex = = 0 && cu_sbt_pos_flag ) \| \|<br>          ( subTuIndex = = 1 && !cu_sbt_pos_flag ) ) ) ) \| \|<br>      ( IntraSubPartitionsSplitType != ISP_NO_SPLIT &&<br>        ( subTuIndex = = NumIntraSubPartitions – 1 ) ) ) {<br>      tu_cbf_cr[ x0 ][ y0 ] | ae(v) |
|       tu_cbf_cr[ x0 ][ y0 ] | ae(v) |
|     }<br>  }<br>  ...<br>} | |

It can be noted that according to Table 3 and Table 4, both luma and chroma CBFs signalling is performed independently from each other's and there is no hierarchical dependencies for chroma CBF flags.

From the SW perspective, VTM4.0.1 includes both of abovementioned aspects.

The hierarchical chroma CBFs signalling method was tested in VTM4.0.1 and demonstrates negligible impact to coding efficiency. On the other hand, support of this feature requires additional non-trivial logic in both SW and specification. It is proposed to remove from the SW hierarchical chroma CBFs signalling method and include to the spec luma CBF deriving. Following table demonstrates modified syntax table.

TABLE 5

Proposed transform_unit syntax table (aspect 1)

| | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|       ( subTuIndex = = 1 && !cu_sbt_pos_flag ) ) ) ) \|\| | |
|     ( IntraSubPartitionsSplitType != ISP_NO_SPLIT && | |
|     ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|   }  | |
| } | |
| if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|     ( ( subTuIndex = = 0 && cu_sbt_pos_flag ) \|\| | |
|     ( subTuIndex = = 1 && !cu_sbt_pos_flag ) ) ) && | |
|     ((CuPredMode[ x0 ][ y0 ] = = MODE_INTRA \|\| tu_cbf_cb[x0 ][ y0 ] \|\| | |
|       tu_cbf_cr[ x0 ][ y0 ] ) \|\| (CbWidth[ x0 ][ y0 ] > MaxTbSizeY \|\| | |
| CbHeight[ x0 ][ y0 ] > MaxTbSizeY )) ) | |
|     \|\|( (IntraSubPartitionsSplitType != ISP_NO_SPLIT) && | |
|     ( subTuIndex < NumIntraSubPartitions − 1 \|\| !InferTuCbfLuma ) ) ) | |
|     tu_cbf_luma[ x0 ][ y0 ] | ae(v) |
| ... | |
| } | |

2.7 Aspect 2

It can be noted, that current version of SW utilizes luma cbf deriving for all possible transform unit partitioning methods besides the partitioning caused by maximal transform size restriction. For design unification, aspect 2 proposes to apply similar method of luma cbf deriving for TUs divided in order to satisfy maximal TU restriction. This unification can share existing mechanism of last luma cbf deriving for ISP. The table below demonstrates proposed modification.

TABLE 6

Proposed transform_unit syntax table (aspect 2)

| | Descriptor |
|---|---|
| transform_unit( x0, y0, tbWidth, tbHeight, treeType, subTuIndex ) { | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|       ( subTuIndex = = 1 && !cu_sbt_pos_flag ) ) ) ) \|\| | |
|     ( IntraSubPartitionsSplitType != ISP_NO_SPLIT && | |
|     ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|   } | |
| } | |
| if( treeType = = SINGLE_TREE \|\| treeType = = DUAL_TREE_LUMA ) { | |
|   if( ( IntraSubPartitionsSplitType = = ISP_NO_SPLIT && !( cu_sbt_flag && | |
|     ( ( subTuIndex = = 0 && cu_sbt_pos_flag ) \|\| | |
|     ( subTuIndex = = 1 && !cu_sbt_pos_flag ) ) ) && | |
|     (CuPredMode[ x0 ][ y0 ] != MODE_INTRA \|\| tu_cbf_cb[ x0 ][ y0 ] | |
| \|\| tu_cbf_cr[ x0 ][ y0 ] ) ) | |
|     \|\|( (IntraSubPartitionsSplitType != ISP_NO_SPLIT \|\| (CbWidth[ x0 ][ y0 ] > MaxTbSizeY | |
| \|\| CbHeight[ x0 ][ y0 ] > MaxTbSizeY )) && | |
|     ( subTuIndex < NumIntraSubPartitions − 1 \|\| !InferTuCbfLuma ) ) ) | |
|     tu_cbf_luma[ x0 ][ y0 ] | ae(v) |
|   if (CuPredMode[ x0 ][ y0 ] == MODE_INTRA) | |

TABLE 6-continued

Proposed transform_unit syntax table (aspect 2)

Descriptor

```
        if (IntraSubPartitionsSplitType != ISP_NO_SPLIT )
            InferTuCbfLuma = InferTuCbfLuma && !tu_cbf_luma[ x0 ][ y0 ]
        else
            InferTuCbfLuma = 0
    else
        InferTuCbfLuma = InferTuCbfLuma && !tu_cbf_luma[ x0 ][ y0 ] &&
!tu_cbf_cb[ x0 ][ y0 ] && !tu_cbf_cr[ x0 ][ y0 ]
...
}
```

2.8 JVET-N0054: Joint Coding of Chrominance Residuals

The joint residual mode is indicated with a flag in the bitstream if the coded block flags (cbf) for both blue difference chroma (Cb) and red difference chroma (Cr) are true. If the mode is activated, a single residual block is decoded. The bitstream syntax and decoding process of joint residual blocks follow those of the Cb residual in VTM-4. The residuals of the Cr blocks are generated by negating the decoded joint residual. As a single residual is used to represent residuals of two blocks, it may often be desirable for this mode to use a QP lower than what is used for separate coding of chrominance residuals. In the core experiments (CE) tests a chroma QP offset of −1 was used for the joint mode and +1 was used for separate chroma coding (as specified in the JVET common test conditions).

The decoder side functionality for the mode can be implemented in VTM DecoderLib as follows:

```
New function:
 void CABACReader::joint_cb_cr( TransformUnit& tu )
 {
  tu.jointCbCr = m_BinDecoder.decodeBin( Ctx::JointCbCrFlag( 0 ) );
 }
Added in CABACReader::residual_coding:
 // Joint Cb-Cr residual mode is signalled if both Cb and Cr cfbs are true
 if ( compID == COMPONENT_Cr && TU::getCbf( tu, COMPONENT_Cb ) )
 {
  joint_cb_cr( tu );
  // No Cr residual in bitstream in joint Cb-Cr residual mode
  if ( tu.jointCbCr )
   return;
 }
Added in DecCu::xIntraRecBlk and DecCu::xDecodeInterTU:
 // Cr uses negative of the signalled Cb residual
 if ( tu.jointCbCr && compID == COMPONENT_Cr )
  piResi.copyAndNegate( cs.getResiBuf( tu.blocks[COMPONENT_Cb] ) );
 else
```

If chrominance reshaper is active, reshaping is applied to the received residual identically to what is done in separate coding modes (that is, the joint residual signal is reshaped). On the encoder side the average of positive Cb residual and negative Cr residual are used as the joint residual when testing this mode:

resJoint=(resCb−resCr)/2

It is further noted that there are possibilities for encoder speed-ups by checking how residuals behave with respect to each other and avoiding entering transform and rate-distortion optimized quantization (RDOQ) stages when joint residual is unlikely to be the best coding alternative.

3. Drawbacks of Existing Implementations

The current design has the following problems:

For single tree cases, the Root Coded Block Flag (Root CBF) (e.g., cu_cbf in JVET-N1001-v7) is used to indicate whether there is at least one non-zero coefficient in a Coding Unit (CU) (i.e., including blocks corresponding to 3 color components in non-monocolor cases).

For dual tree cases, the Root CBF for the luma color component (denoted as luma-Root CBF) (e.g., cu_cbf in JVET-N1001-v7 when coding the luma component with the dual tree coding structure) is used to indicate whether there is at least one non-zero coefficient in a luma block. The Root CBF for the chroma color components (denoted as chroma-Root CBF) (e.g., cu_cbf in JVET-N1001-v7 when coding the Chroma components with the dual tree coding structure) is used to indicate whether there is at least one non-zero coefficient in the chroma blocks.

When Root CBF is 1, one or multiple transform blocks of the CU are coded. And a CBF is signaled or inferred for a transform block to indicate whether there is at least one non-zero coefficient in the transform block. Specifically, a Luma-CBF (e.g., tu_cbf luma in JVET-N1001-v7) indicates whether there is at least one non-zero coefficient in a luma transform block. A Cb-CBF (e.g., tu_cbf_cb in JVET-N1001-v7) indicates whether there is at least one non-zero coefficient in a Cb transform block. A Cr-CBF (e.g., tu_cbf_cr in JVET-N1001-v7) indicates whether there is at least one non-zero coefficient in a Cr transform block.

1. luma-Root CBF and chroma-Root CBF may be both signaled in the dual-tree structure. However, it may be sub-optimal in terms of coding efficiency.

2. When joint Cb-Cr coding is applied, only one chroma block's residual information may be coded. However, in the current design, CBFs for both Cb and Cr are signaled which causes less efficiency.
3. When a CU is split into more than one transform blocks, there are two cases. If ISP is applied, at least one CBF of the transform blocks must be 1 when the Root CBF is equal to 1. In other cases, all the CBFs for the transform blocks may be equal to 0 when the Root CBF is equal to 1.
4. In dual tree cases, when cu_cbf is equal to 0 and tu_cbf_cb is equal to 0, tu_cbf_cr shall be non-zero. However, tu_cbf_cr is still signaled in this case.

4. Example Methods for Signaling Significant Coefficients

Embodiments of the presently disclosed technology overcome the drawbacks of existing implementations, thereby providing video coding with higher coding efficiencies. The methods for signaling significant coefficients, based on the disclosed technology, may enhance both existing and future video coding standards, is elucidated in the following examples described for various implementations.

The examples of the disclosed technology provided below explain general concepts, and are not meant to be interpreted as limiting. In an example, unless explicitly indicated to the contrary, the various features described in these examples may be combined.

In the following discussion, a CU may comprise information associated to all the three color components with the single tree coding structure. Or a CU may comprise information only associated to the luma color component with the mono-color coding. Or a CU may comprise information only associated to the luma color component (e.g., luminance (Y) component in YCbCr format or green (G) component in GBR format) with the dual tree coding structure. Or a CU may comprise information only associated to the two chroma components (e.g., Cb and Cr components in YCbCr format or blue (B) and red (R) components in GBR format) with the dual-tree coding structure.

In the following description, a "block" may refer to coding unit (CU) or a transform unit (TU) or any rectangle region of video data. a "current block" may refer to a current being decoded/coded coding unit (CU) or a current being decoded/coded transform unit (TU) or any being decoded/coded coding rectangle region of video data. "CU" or "TU" may be also known as "coding block" and "transform block".

About Root CBF
1. The signaling of (Root CBF) which indicates whether there is non-zero coefficient in a CU (such as cu_cbf in JVET-N1001-v7) may depend on whether single tree or dual tree is applied.
   a. In one example, the luma-Root CBF is not signaled when dual tree is applied.
      i. Alternatively, furthermore, the Luma-CBF is signaled regardless of the value of luma-Root CBF.
   b. In one example, the chroma-Root CBF is not signaled when dual tree is applied.
      i. Alternatively, furthermore, the Cb-CBF is signaled regardless of the value of chroma-Root CBF.
      ii. Alternatively, furthermore, the Cr-CBF is signaled regardless of the value of chroma-Root CBF.
2. The signaling of root CBF of a CU or luma-Root CBF/chroma-Root CBF under dual tree may depend on whether intra block copy (IBC) is applied.
   a. The signaling of root CBF of a CU or luma-Root CBF/chroma-Root CBF under dual tree may depend on whether inter prediction excluding IBC is applied.
   b. A root CBF of a CU is not signaled when IBC is used for the CU.
      i. Alternatively, furthermore, it is inferred to be equal to the Luma-CBF or (Cb-CBF OR Cr-CBF).
      ii. Alternatively, furthermore, only when dual tree is enabled, the above method may be applied.
   c. Alternatively, a root CBF of a CU is signaled only if the CU is coded as inter mode.
3. If the chroma-root CBF is 1 and the current CU is a chroma CU in a dual tree structure, Cb-CBF (such as tu_cbf_cb in JVET-N1001-v7) and Cr-CBF (such as tu_cbf_cr in JVET-N1001-v7) may be signaled conditionally.
   a. In one example, signaling of Cr-CBF is dependent on Cb-CBF.
      i. In one example, if Cb-CBF is 0, Cr-CBF is not signaled.
         1) For example, Cr-CBF is inferred to be 1.
   b. In one example, signaling of Cb-CBF is dependent on Cr-CBF.
      i. In one example, if Cr-CBF is 0, Cb-CBF is not signaled.
         1) For example, Cb-CBF inferred to be 1.
   c. The signaling of Cb-CBF and/or Cr-CBF may further depend on the block dimensions.
      i. Bullet 3.a and/or 3.b may only be applied when both the width and height of the current CU/TU are no larger than the maximum transform size.
4. Luma-CBF (such as tu_cbf_luma in JVET-N1001-v7) may be signaled conditionally based on whether the current CU is a luma CU in a dual tree structure when luma-root CBF is 1.
   a. Luma-CBF is not signaled when the current CU is a luma CU in a dual tree structure and luma-root CBF is 1.
      i. For example, Luma-CBF is inferred to be 1.
   b. The signaling of Luma-CBF may further depend on the block dimensions.
      i. Bullet 4.a is applied only when both the width and height of the current CU are no larger than the maximum transform size.
5. For above examples, the signaling of a syntax may indicate whether to signal the syntax or not. Alternatively, the signaling of a syntax may comprise the context used for coding the syntax.

About Chroma CBF and Joint Chroma Residual Coding
6. Joint chroma residual coding related syntax elements (e.g., usage of this tool) may be signaled before signaling of Cb-CBF and Cr-CBF.
   a. In one example, Cb-CBF and Cr-CBF may be signaled depending on the indication of joint chroma residual coding.
      i. In one example, Cb-CBF and Cr-CBF may not be signaled when joint chroma residual coding is applied.
         1) For example, Cb-CBF and Cr-CBF are inferred to be 1 when joint chroma residual coding is applied.
   b. In one example, this method may be applied only in dual tree case.
7. Indication of joint chroma residual coding related syntax elements (e.g., usage of this tool) may be signaled after Cx-CBF but before Cy-CBF. In one example, Cx=Cb, Cy=Cr. In a second example, Cx=Cr, Cy=Cb.

a. In one example, the indication of joint chroma residual coding may be signaled depending on Cx-CBF.
   i. In one example, the indication of joint chroma residual coding may not be signaled when Cx-CBF is 0.
      1) For example, joint chroma residual coding may be inferred as not to be applied when Cx-CBF is 0.
b. In one example, Cy-CBF may be signaled depending on the indication of joint chroma residual coding.
   i. In one example, Cy-CBF may not be signaled when joint chroma residual coding is applied.
      1) For example, Cy-CBF is inferred to be 1 when joint chroma residual coding is applied.
c. Alternatively, furthermore, the signaling of root CBF or chroma-root CBF may be skipped.

8. Joint chroma residual coding related syntax elements (e.g., usage of this tool) may be conditionally signaled according to the coded information.
   a. Joint chroma residual coding related syntax elements may be signaled under the conditions of coded mode.
      i. In one example, joint chroma residual coding related syntax elements may not be signaled if the block is coded with IBC.
         1) Alternatively, furthermore, for IBC coded blocks, joint chroma residual coding may be inferred to be disabled.
      ii. In one example, joint chroma residual coding related syntax elements may not be signaled if the block is coded with inter.
         1) Alternatively, furthermore, for inter coded blocks, joint chroma residual coding may be inferred to be disabled.
      iii. In one example, joint chroma residual coding related syntax elements may be signaled only if the chroma blocks are coded with CCLM mode.
      iv. In one example, joint chroma residual coding related syntax elements may not be signaled if the chroma blocks are coded with CCLM mode.
         1) Alternatively, furthermore, joint chroma residual coding may be derived to be enabled.
         2) Alternatively, furthermore, parameters used in joint chroma residual coding may be derived from the CCLM parameters derived for Cb and Cr.
   b. Whether to signal joint chroma residual coding related syntax elements may depend on the condition of lossless coding.
      i. In one example, joint chroma residual coding related syntax elements may not be signaled if the block is coded with lossless-coding.
         1) Joint chroma residual coding is inferred to be disabled.
   c. Joint chroma residual coding and lossless are exclusively used for a block.
      i. Alternatively, furthermore, signaling of lossless coding related syntax elements may be under the condition of the usage of joint chroma residual coding is false.
         1) In one example, if joint chroma residual coding is enabled, the lossless coding related syntax elements are not signaled and inferred to be disabled.
   d. Whether to apply joint chroma residual coding may be signaled at sequence/picture/slice/tile group/tile level such as in DPS/VPS/SPS/PPS/APS/picture header/slice header/tile group header.
      i. In one example, if joint chroma residual coding is disabled at sequence/picture/slice/tile group/tile level, joint chroma residual coding related syntax elements (e.g., tu_joint_cbcr_residual in JVET-N1001-v7) may not be signaled at block level.

Coding for More Than One Transform Blocks

9. Whether to signal a Luma-CBF may depend on previously signaled Luma-CBFs in the CU when the current CU is not coded with the ISP mode.
   a. In one example, the Luma-CBF associated the last sub-block in the CU may not be signaled if all the previously signaled Luma-CBFs associated with other sub-blocks in the CU are zero.
      i. In one example, the last Luma-CBF may be inferred to be 1.
      ii. In one example, Bullet 9 is applied only when luma-root CBF is signaled to be 1.
      iii. In one example, Bullet 9 is applied only when dual-tree structure is applied.

10. Whether to signal a Cx-CBF may depend on previously signaled Cb-CBFs and Cr-CBFs in the CU when the current CU, wherein Cx may be Cb or Cr.
    a. In one example, the last Cx-CBF in the CU may not be signaled if all the previously signaled Cb-CBFs and Cr-CBFs in the CU are zero.
       i. In one example, the last Cx-CBF may be inferred to be 1.
       ii. In one example, Bullet 10 is applied only when chroma-root CBF is signaled to be 1.
       iii. In one example, Bullet 10 is applied only when dual-tree structure is applied.

11. It is allowed that all Luma-CBFs in the CU are equal to 0 when the current CU is not coded with the ISP mode.
    a. In one example, signaling of a Luma-CBF is decoupled from previously signaled Luma-CBFs in the CU when the current CU is coded with the ISP mode.

12. Luma-CBF in SBT coded CU may not be signaled and inferred to be 1, e.g., SBT may be allowed only when CU has non-zero luma residual.
    a. In one example, such constraint may be applied to some specific block sizes.
       i. Alternatively, furthermore, different blocks sizes may be designed for different SBT mode.

Delta QP Changes

13. It is proposed that individual delta QP information may be signaled for each sub-block in a CU coded with ISP mode.
    a. For example, individual delta QP information is signaled for a sub-block in a CU coded with ISP mode when at least one coefficient is not equal to 0 in the sub-block.

14. It is proposed that the delta QP information may be only signaled for the first sub-block (or TU) in a CU coded with ISP mode, no matter there is non-zero coefficient in the first sub-block (or TU) or not.

15. It is proposed that the delta QP information may be only signaled for the first TU in a CU coded with more than one TUs, no matter there is non-zero coefficient in the first TU or not.
    a. Whether to apply bullet 15 may depend on the dimensions W×H of the current CU. For example, bullet 15 may be applied if W is larger than T1 or H is larger than T2. E.g., T1=T2=64. In another example, T1 and T2 are equal to the maximum allowed transform size.

16. When there are multiple TUs within one CU and delta QP may be signaled multiple times.
   a. In one example, it may be signaled for the first TU in the coding order.
   b. In one example, it may be signaled for the remaining TUs if the root CBF is equal to 1.
   c. In one example, it may be signaled for the remaining TUs if the tu_cbf luma is equal to 1.
17. When there are multiple TUs within one CU and delta QP is signaled once for a TU, the setting of delta QPs for the remaining TUs may follow the methods below:
   a. In one example, delta QPs for the remaining TUs may be set equal to that for the signaled delta QP.
   b. Alternatively, delta QPs for the remaining TUs may be set equal to 0. Handling of larger blocks
18. When a coding tree unit (CTU) size is greater than the maximum transform block sizes, the splitting patterns may be different for different color components when the single-tree structure is applied. Suppose the allowed maximum transform size is T, and the dimensions of a CU (or CTU) under consideration is M×N in luma sample unit.
   a. For example, if M is larger than T or N is larger than T, the luma block may be further split but the corresponding chroma blocks may not be split.
      i. In one example, suppose the scaling horizontal and vertical scaling factor from chroma samples to luma samples are P and Q (e.g., P=Q=2 when the color format is 4:2:0), if M/P is larger than T or N/Q is larger than T, the chroma blocks may be further split. Otherwise, they are not further split.
      ii. In one example, if the CTU size is 128×128, maximum transform block size is 64×64, then the luma block may be split to 4 blocks, while the chroma block may be not split.

Figure 11:
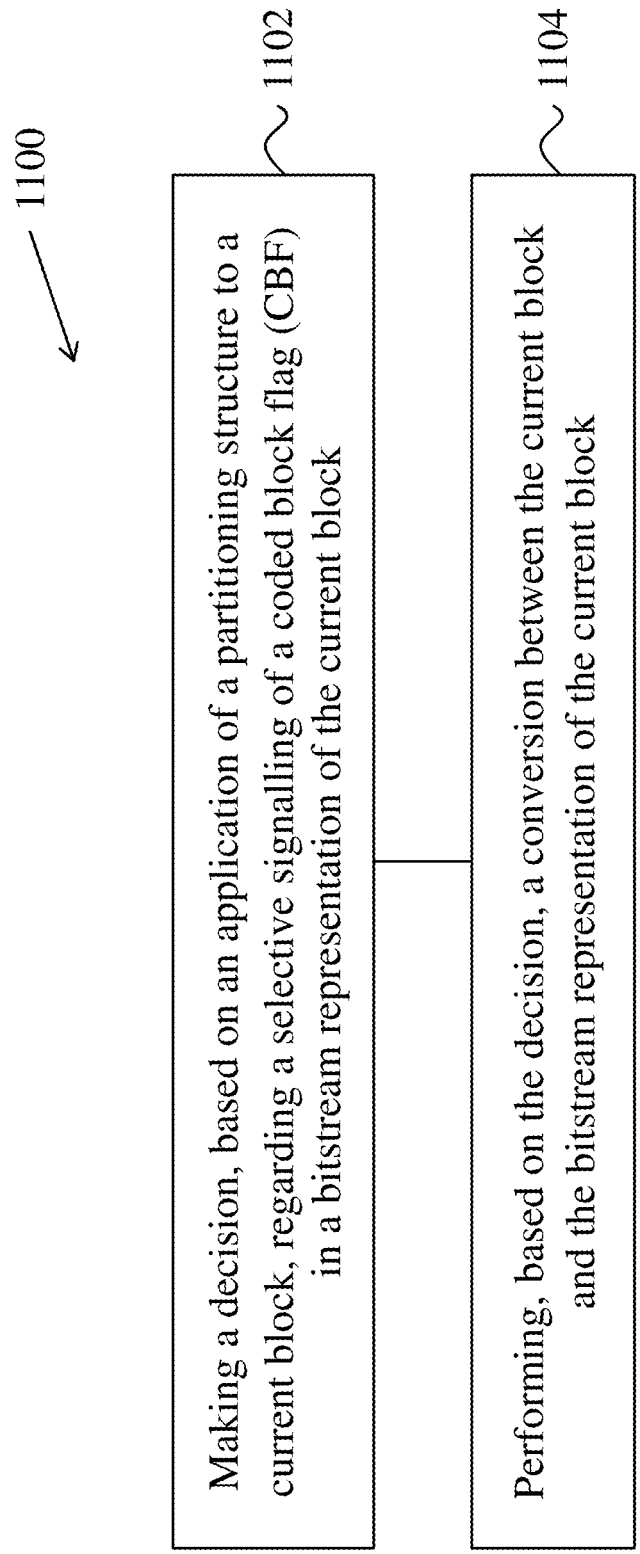
FIG. 11 shows a flowchart of an example method for video processing.

FIG. 11 shows a flowchart of an exemplary method for video processing. The method 1100 includes making (1102) a decision, based on an application of a partitioning structure to a current block, regarding a selective signaling of a coded block flag (CBF) in a bitstream representation of the current block; and performing (1104), based on the decision, a conversion between the current block and the bitstream representation of the current block.

The following listing of examples provide embodiments that can addressed the technical problems described in the present disclosure, among other problems.

1. A method for video processing (e.g., method 1100), comprising making a decision, based on an application of a partitioning structure to a current block, regarding a selective signaling of a coded block flag (CBF) in a bitstream representation of the current block; and performing, based on the decision, a conversion between the current block and the bitstream representation of the current block.

2. The method of example 1, wherein the CBF comprises a luma-Root CBF that is not signaled when the partitioning structure comprises a dual tree.

3. The method of example 1, wherein the CBF comprises a chroma-Root CBF that is not signaled when the partitioning structure comprises a dual tree.

4. The method of example 1, wherein the partitioning structure comprises a dual tree, and wherein the decision is further based on a selective application of an intra block copy (IBC) mode to the current block.

5. The method of example 4, wherein the CBF is a root CBF of the current block that is not signaled when the IBC mode is applied to the current block.

6. The method of example 4, wherein the CBF is a root CBF of the current block that is signaled when the current block is coded using an inter mode.

7. The method of example 1, wherein the current block is a chroma block, wherein the partitioning structure comprises a dual tree, wherein a chroma-root CBF for the current block is 1, and wherein the CBF comprises a Cb-CBF and a Cr-CBF.

8. The method of example 7, wherein the selective signaling of the Cb-CBF and Cr-CBF is further based on dimensions of the current block.

9. The method of example 1, wherein the current block is a luma block, wherein the partitioning structure comprises a dual tree, wherein a luma-root CBF for the current block is 1, and wherein the CBF comprises a Luma-CBF.

10. The method of example 9, wherein the selective signaling of the Luma-CBF is further based on dimensions of the current block.

11. The method of example 8 or 10, wherein a width and a height of the current block are not greater than a width and a height of a maximum transform size, respectively.

12. The method of any of example 1 to 11, wherein the signaling of the CBF comprises a context used to code the CBF.

13. A method for video processing, comprising: configuring, for a conversion between a current block and a bitstream representation of the current block, the bitstream representation, wherein the configuring comprises signaling one or more syntax elements related to a joint chroma residual coding process in the bitstream representation before selectively signaling a coded block flag (CBF) for a chroma component; and performing, based on the configuring, the conversion.

14. The method of example 13, wherein the CBF for the chroma component comprises Cb-CBF and Cr-CBF.

15. The method of example 13 or 14, wherein the CBF for the chroma component is not signaled when the joint chroma residual coding process is applied to the current block.

16. The method of example 13 or 14, wherein the CBF for the chroma component is inferred to be 1 when the joint chroma residual coding process is applied to the current block.

17. The method of any of examples 13 to 16, wherein the current block is partitioned based on a dual tree partitioning structure.

18. The method of example 13, wherein the CBF for the chroma component comprises Cx CBF and Cy CBF, and wherein the one or more syntax elements are signaled before Cy CBF and after Cx-CBF.

19. The method of example 18, wherein Cx-CBF is Cb-CBF and Cy-CBF is Cr-CBF.

20. The method of example 18, wherein Cx-CBF is Cr-CBF and Cy-CBF is Cb-CBF.

21. The method of example 13, wherein signaling the one or more syntax elements is based on a coding mode of the current block.

22. The method of example 21, wherein the one or more syntax elements is signaled when the current block is coded using a cross-component linear mode (CCLM) mode.

23. The method of example 21, the one or more syntax elements is not signaled when the current block is coded using a lossless coding technique.

24. A method for video processing, comprising making a decision regarding a selective signaling of a coded block flag (CBF) based on a coding mode of a current block and one or more previously signaled CBFs; and performing, based on the decision, a conversion between the current block and a bitstream representation of the current block.

25. The method of example 24, wherein the coding mode is an intra sub-block partitioning (ISP) mode, wherein the current block comprises (K+1) sub-blocks, wherein the one or more previously signaled CBFs comprise CBFs of a first K sub-blocks, and wherein the CBF is a CBF of a last sub-block that is not signaled when each of the CBFs of the first K sub-blocks is zero.

26. The method of example 24 or 25, wherein the current block is partitioned based on a dual tree partitioning structure.

27. The method of any of examples 24 to 26, wherein the CBF is a Luma-CBF.

28. The method of any of examples 24 to 26, wherein the CBR is a Cr-CBF or a Cb-CBF.

29. A method for video processing, comprising: determining that a current block is coded with an intra sub-block partitioning (ISP) mode; configuring, based on the determining, a bitstream representation of the current block to include individual delta quantization parameter (QP) information for one or more sub-blocks of the current block; and performing, based on the configuring, a conversion between the current block and the bitstream representation of the current block.

30. The method of example 29, wherein the bitstream representation includes individual delta QP information for each of the one or more blocks of the current block.

31. The method of example 29, wherein the bitstream representation includes individual delta QP information for only a first sub-block of the one or more blocks of the current block.

32. The method of any of examples 1 to 31, wherein the current block is a coding unit (CU), a transform unit (TU) of a rectangular region of video data.

33. An apparatus in a video system comprising a processor and a non-transitory memory with instructions thereon, wherein the instructions upon execution by the processor, cause the processor to implement the method in any one of examples 1 to 32.

34. A computer program product stored on a non-transitory computer readable media, the computer program product including program code for carrying out the method in any one of examples 1 to 32.

5. Example Implementations of the Disclosed Technology

All the working draft changes are based on JVET-N1001-v7.

In the following exemplary embodiments, the changes on top of JVET-N1001-v2 are highlighted in bolded, underlined, italicized font. Deleted texts are marked with double brackets (e.g., denotes the deletion of the character "a").

5.1 Embodiment #1

This subsection presents an example of bullet 3 in section 4.

7.3.7.10 Transform Unit Syntax

|  | Descriptor |
|---|---|
| transform_unit( x0, y0, tbWidth, tbHeight, treeType, subTuIndex ) { <br>   if( ( treeType = = SINGLE_TREE \|\| treeType = = DUAL_TREE_CHROMA ) { <br>     if( ( IntraSubPartitionsSplitType = = ISP_NO_SPLIT && !( cu_sbt_flag && <br>       ( ( subTuIndex = = 0 && cu_sbt_pos_flag ) \|\| <br>         ( subTuIndex = = 1 && !cu_sbt_pos_flag ) ) ) ) \|\| <br>     ( IntraSubPartitionsSplitType != ISP_NO_SPLIT && <br>       ( subTuIndex = = NumIntraSubPartitions − 1 ) ) ) { <br>       tu_cbf_cb[ x0 ][ y0 ] |  |
|  | ae(v) |
|     *if(treeType = = SINGLE_TREE \|\| CuPredMode[ x0 ][ y0 ] == MODE_INTRA \|\|* <br> *tu_cbf_cb[ x0 ][ y0 ] \|\| CbWidth[ x0 ][ y0 ] > MaxTbSizeY \|\| CbHeight[ x0 ][ y0 ] > MaxTbSizeY* <br> *)* <br>       tu_cbf_cr[ x0 ][ y0 ] <br>     } <br>   } <br> ... |  |
|  | ae(v) | tu_cbf_cr[x0][y0] equal to 1 specifies that the Cr transform block contains one or more transform coefficient levels not equal to 0. The array indices x0, y0 specify the top-left location (x0, y0) of the considered transform block.

When to cbf_crf[x0][y0] is not present in the current CU, its value is inferred to be equal to C. If all the following conditions are satisfied, C is equal to 1. Otherwise, it is equal to 0.

cu_cbf=1
treeType==DUAL_TREE_CHROMA
CuPredMode[x0][y0]!=MODE_INTRA
tu_cbf_cb[x0][y0]==0;
CbWidth[x0][y0]<=MaxTbSizeY
CbHeight[x0][y0]<=MaxTbSizeY Alternatively, the following may apply, e.g., assuming MaxTbSizeY is equal to 64.

7.3.7.11 Transform Unit Syntax

|  | Descriptor |
|---|---|
| transform_unit( x0, y0, tbWidth, tbHeight, treeType, subTuIndex ) { <br>   if( ( treeType = = SINGLE_TREE \|\| treeType = = DUAL_TREE_CHROMA ) { <br>     if( ( IntraSubPartitionsSplitType = = ISP_NO_SPLIT && !( cu_sbt_flag && <br>       ( ( subTuIndex = = 0 && cu_sbt_pos_flag ) \|\| <br>         ( subTuIndex = = 1 && !cu_sbt_pos_flag ) ) ) ) \|\| |  |

| | Descriptor |
|---|---|
|       ( IntraSubPartitionsSplitType != ISP_NO_SPLIT &&<br>        ( subTuIndex = = NumIntraSubPartitions − 1 ) ) ) {<br>        tu_cbf_cb[ x0 ][ y0 ] | ae(v) |
| *if(treeType == SINGLE_TREE \|\| CuPredMode[ x0 ][ y0 ] ==MODE_INTRA \|\| tu_cbf_cb[ x0 ][ y0 ] )* | |
|            tu_cbf_cr[ x0 ][ y0 ]<br>      }<br>    }<br>... | ae(v) |

When tu_cbf_x[x0][y0] is not present in the current CU, its value is inferred to be equal to C. If all the following conditions are satisfied, C is equal to 1. Otherwise, it is equal to 0.

cu_cbf=1
  treeType==DUAL_TREE_CHROMA
  CuPredMode[x0][y0]!=MODE_INTRA
tu_cbf_cb[x0][y0]==0;

5.2 Embodiment #2

This subsection presents an example of bullet 2 in section 4.

7.3.7.5 Coding Unit Syntax

| | Descriptor |
|---|---|
| coding_unit( x0, y0, cbWidth, cbHeight, treeType ) {<br>  ...<br>  if( !pcm_flag[ x0 ][ y0 ] ) {<br>    if*(CuPredMode[ x0 ][ y0 ] == MODE_INTER* &&<br>      general_merge_flag[ x0 ][ y0 ] = = 0 )<br>      cu_cbf<br>... | ae(v) |

Alternatively, the following may apply.

| | Descriptor |
|---|---|
| coding_unit( x0, y0, cbWidth, cbHeight, treeType ) {<br>  ...<br>  if( !pcm_flag[ x0 ][ y0 ] ) {<br>    if(  *!(CuPredMode[ x0 ][ y0 ] == MODE_IBC && treeType != SINGLE_TREE)* &&<br>      general_merge_flag[ x0 ][ y0 ] = = 0 )<br>      cu_cbf<br>... | ae(v) |

Alternatively, the following may apply.

| | Descriptor |
|---|---|
| coding_unit( x0, y0, cbWidth, cbHeight, treeType ) {<br>  ...<br>  if( !pcm_flag[ x0 ][ y0 ] ) {<br>    if( *(CuPredMode[ x0 ][ y0 ] ==MODE_INTER\|\| (CuPredMode[ x0 ][ y0 ] == == MODE_IBC && treeType = == DUAL_TREE_CHROMA) )* &&<br>      general_merge_flag[ x0 ][ y0 ] = = 0 )<br>      cu_cbf<br>... | ae(v) |

5.3 Embodiment #3

7.3.7.6 Transform Unit Syntax

|  | Descriptor |
|---|---|
| transform_unit( x0, y0, tbWidth, tbHeight, treeType, subTuIndex ) { <br> ... <br>   if( treeType = = SINGLE_TREE \|\| treeType = = DUAL_TREE_LUMA ) { <br>     if( ( IntraSubPartitionsSplitType = = ISP_NO_SPLIT && !( cu_sbt_flag && <br>       ( ( subTuIndex = = 0 && cu_sbt_pos_flag ) \|\| <br>        ( subTuIndex = = 1 && !cu_sbt_pos_flag ) ) ) && <br>       (( *CuPredMode[ x0 ][ y0 ] ! = MODE_INTER*  \|\| tu_cbf_cb[ x0 ][ y0 ] \|\| tu_cbf_cr[ x0 ] <br> [ y0 ]) \|\| (CbWidth[ x0 ][ y0 ] > maxTbSizeY \|\| CbHeight[ x0 ][ y0 ] \|\| > MaxTbSizeY )) ) <br>     \|\|( (IntraSubPartitionsSplitType != ISP_NO_SPLIT) && <br>     ( subTuIndex < NumIntraSubPartitions − 1 \|\| !InferTuCbfLuma ) ) ) <br>     tu_cbf_luma[ x0 ][ y0 ] <br> ... |  <br><br><br><br><br><br><br><br><br><br> ae(v) |

5.4 Embodiment #4

This subsection presents an example of bullet 6 in section 4.

7.3.7.11 Transform Unit Syntax

|  | Descriptor |
|---|---|
| transform_unit( x0, y0, tbWidth, tbHeight, treeType, subTuIndex ) { <br>   if( ( treeType = = SINGLE_TREE \|\| treeType = = DUAL_TREE_CHROMA ) { <br>     if( ( IntraSubPartitionsSplitType = = ISP_NO_SPLIT && !( cu_sbt_flag && <br>       ( ( subTuIndex = = 0 && cu_sbt_pos_flag ) \|\| <br>        ( subTuIndex = = 1 && !cu_sbt_pos_flag ) ) ) ) \|\| <br>      ( IntraSubPartitionsSplitType != ISP_NO_SPLIT && <br>       ( subTuIndex = = NumIntraSubPartitions − 1 ) ) ) { <br>         *tu_joint_cbcr_residual[ x0 ][ y0 ]* <br>         *if(tu_joint_cbcr_residual[ x0 ][ y0 ]{* <br>     tu_cbf_cb[ x0 ][ y0 ] <br>         tu_cbf_cr[ x0 ][ y0 ] <br>   } <br>     } <br>       } <br> ... <br>     if( tu_cbf_cb[ x0 ][ y0 ] *\|\| tu_joint_cbcr_residual[ x0 ][ y0 ]* <br>       residual_coding( xC, yC, Log2( wC ), Log2( hC ), 1 ) <br>     if( tu_cbf_cr[ x0 ][ y0 ] *&& !tu_joint_cbcr_residual[ x0 ][ y0 ]* ) { <br> [[      if( tu_cbf_cb[ x0 ][ y0 ]) <br>         tu_joint_cbcr_residual[ x0 ][ y0 ] <br>      if( !tu_joint_cbcr_residual[ x0 ][ y0 ] )  ]] <br>         residual_coding( xC, yC, Log2( wC ), Log2( hC ), 2 ) <br>   } <br> } | <br><br><br><br><br><br><br> ae(v) <br> ae(v) <br><br> ae(v) <br><br><br><br><br><br><br><br><br><br><br> [[ae(v)]] |

When tu_cbf_cb[x0][y0] is not present in the current CU, it is inferred to be 1 if tu_joint_cbcr_residual[x0][y0] is equal to 1. Otherwise, it is inferred to be 0.
When tu_cbf_cr[x0][y0] is not present in the current CU, it is inferred to be 1 if tu_joint_cbcr_residual[x0][y0] is equal to 1. Otherwise, it is inferred to be 0.

An Alternative Example

|  | Descriptor |
|---|---|
| transform_unit( x0, y0, tbWidth, tbHeight, treeType, subTuIndex ) { <br>   if( ( treeType = = SINGLE_TREE \|\| treeType = = DUAL_TREE_CHROMA ) { <br>     if( ( IntraSubPartitionsSplitType = = ISP_NO_SPLIT && !( cu_sbt_flag && <br>       ( ( subTuIndex = = 0 && cu_sbt_pos_flag ) \|\| <br>        ( subTuIndex = = 1 && !cu_sbt_pos_flag ) ) ) ) \|\| <br>      ( IntraSubPartitionsSplitType != ISP_NO_SPLIT && <br>       ( subTuIndex = = NumIntraSubPartitions − 1 ) ) ) { <br>   tu_cbf_cn[ x0 ][ y0 ] | <br><br><br><br><br><br><br> ae(v) |

|  | Descriptor |
|---|---|
| *tu_joint_cbcr_residual[ x0 ][ y0 ]* | *ae(v)* |
| *if(!tu_joint_cbcr_residual[ x0 ][ y0 ])* | |
|     tu_cbf_cr[ x0 ][ y0 ] | ae(v) |
|     } | |
|   } | |
| ... | |
|   if( tu_cbf_cb[ x0 ][ y0 ]) | |
|     residual_coding( xC, yC, Log2( wC ), Log2( hC ), 1 ) | |
|   if( tu_cbf_cr[ x0 ][ y0 ] *&& !tu_joint_cbcr_residual[ x0 ][ y0 ]* ) { | |
|   [[  if( tu_cbf_cb[ x0 ][ y0 ]) | |
|     tu_joint_cbcr_residual[ x0 ][ y0 ] | [[ae(v)]] |
|     if( !tu_joint_cbcr_residual[ x0 ][ y0 ] )]] | |
|       residual_coding( xC, yC, Log2( wC ), Log2( hC ), 2 ) | |
|   } | |
| } | |

When tu_cbf_cr[x0][y0] is not present in the current CU, it is inferred to be 1 if tu_joint_cbcr_residual[x0][y0] is equal to 1. Otherwise, it is inferred to be 0.

5.5 Embodiment #5

This subsection presents an example of bullet 14 and 15.

Transform Unit Syntax

|  | Descriptor |
|---|---|
| transform_unit( x0, y0, tbWidth, tbHeight, treeType, subTuIndex ) { | |
| ... | |
|   if( ( tu_cbf_luma[ x0 ][ y0 ] \|\| tu_cbf_cb[ x0 ][ y0 ] \|\| tu_cbf_cr[ x0 ][ y0 ] ) && | |
|     treeType != DUAL_TREE_CHROMA ) { | |
|     if( cu_qp_delta_enabled_flag && *x0 == CbX[x0][y0] && y0 == CbU[x0][y0]* | |
| [[!IsCuQpDeltaCoded]] ) { | |
|       cu_qp_delta_abs | ae(v) |
|       if( cu_qp_delta_abs ) | |
|         cu_qp_delta_sign_flag | ae(v) |
|     } | |
|   } | |
| ... | |

(CbX[x0][y0], CbY[x0][y0]) specifies the top-left position of the codink unit coverink the position (x0, y0).

In an alternative embodiment

|  | Descriptor |
|---|---|
| transform_unit( x0, y0, tbWidth, tbHeight, treeType, subTuIndex ) { | |
| ... | |
|   if( [[( tu_cbf_luma[ x0 ][ y0 ] \|\| tu_cbf_cb[ x0 ][ y0 ] \|\| tu_cbf_cr[ x0 ][ y0 ] ) &&]] | |
|     treeType != DUAL_TREE_CHROMA ) { | |
|     if( cu_qp_delta_enabled_flag && *x0 == CbX[x0][y0] && y0 == CbU[x0][y0]* | |
| [[!IsCuQpDeltaCoded]] ) { | |
|       cu_qp_delta_abs | ae(v) |
|       if( cu_qp_delta_abs ) | |
|         cu_qp_delta_sign_flag | ae(v) |
|     } | |
|   } | |
| ... | |

(CbX[x0][y0], CbY[x0][y0]) specifies the top-left position of the coding unit covering the position (x0, y0).

In an alternative embodiment

|  | Descriptor |
|---|---|
| transform_unit( x0, y0, tbWidth, tbHeight, treeType, subTuIndex ) { | |
| ... | |
|     *if(   cu_qp_delta_enabled_flag && treeType !=DUAL_TREE_CHROMA)* | |
| *{* | |
|         *If((x0 == CbX[x0][y0] && y0 ==CbU[x0][y0] && (cbWidth[x0][y0] >64 \|\|* | |
| *cbHeight[x0][y0] >64 )) \|\| (cbWidth[x0][y0]<=64 && cbHeight[x0][y0] <=64 &&* | |
| *( tu_cbf_luma[ x0 ][ y0 ] \|\| tu_cbf_cb[ x0 ][ y0 ] \|\| tu_cbf_cr[ x0 ][ y0 ] ) &&* | |
| *!sCuQpDeltaCoded )) {* | |
|             cu_qp_delta_abs | ae(v) |
|             if( cu_qp_delta_abs ) | |
|                 cu_qp_delta_sign_flag | ae(v) |
|         } | |
|     } | |
| ... | |

(CbX[x0][y0], CbY[x0][y0]) specifies the top-left position of the coding unit covering the position (x0, y0).

Figure 12:
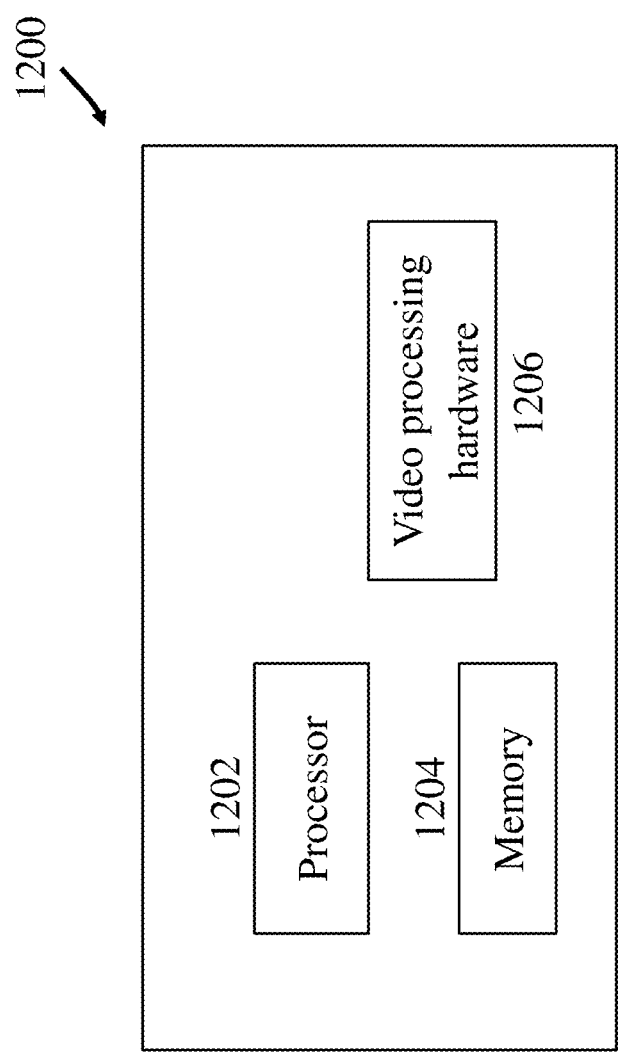
FIG. 12 is a block diagram of an example of a hardware platform for implementing a visual media decoding or a visual media encoding technique described in the present disclosure.

FIG. 12 is a block diagram of a video processing apparatus 1200. The apparatus 1200 may be used to implement one or more of the methods described herein. The apparatus 1200 may be embodied in a smartphone, tablet, computer, Internet of Things (IoT) receiver, and so on. The apparatus 1200 may include one or more processors 1202, one or more memories 1204 and video processing hardware 1206. The processor(s) 1202 may be configured to implement one or more methods described in the present disclosure. The memory (memories) 1204 may be used for storing data and code used for implementing the methods and techniques described herein. The video processing hardware 1206 may be used to implement, in hardware circuitry, some techniques described in the present disclosure.

In some embodiments, the video coding methods may be implemented using an apparatus that is implemented on a hardware platform as described with respect to FIG. 12.

In the present disclosure, the term "video processing" or "visual media processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Figure 13:
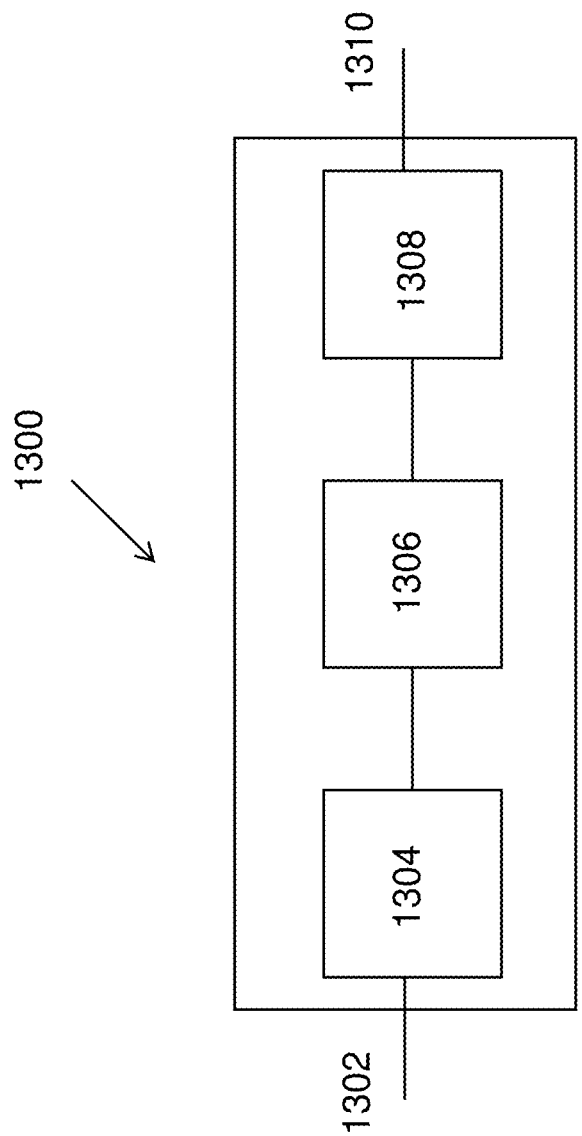
FIG. 13 is a block diagram of an example video processing system in which disclosed techniques may be implemented.

FIG. 13 is a block diagram showing an example video processing system 1300 in which various techniques disclosed herein may be implemented. Various implementations may include some or all of the components of the system 1300. The system 1300 may include input 1302 for receiving video content. The video content may be received in a raw or uncompressed format, e.g., 8 or 10 bit multi-component pixel values, or may be in a compressed or encoded format. The input 1302 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1300 may include a coding component 1304 that may implement the various coding or encoding methods described in the present disclosure. The coding component 1304 may reduce the average bitrate of video from the input 1302 to the output of the coding component 1304 to produce a coded representation of the video. The coding techniques are therefore sometimes called video compression or video transcoding techniques. The output of the coding component 1304 may be either stored, or transmitted via a communication connected, as represented by the component 1306. The stored or communicated bitstream (or coded) representation of the video received at the input 1302 may be used by the component 1308 for generating pixel values or displayable video that is sent to a display interface 1310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 14:
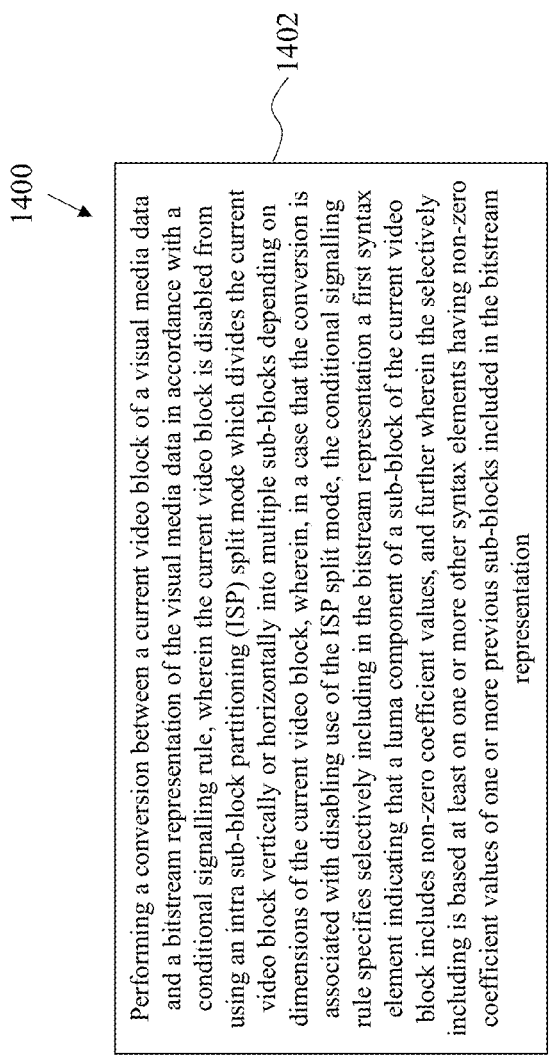
FIG. 14 shows a flowchart of an example method for visual media processing.

FIG. 14 shows a flowchart of an example method for visual media processing. Steps for this flowchart are discussed in example 9 in Section 4 of this disclosure. At step 1402, the process performs a conversion between a current video block of a visual media data and a bitstream representation of the visual media data in accordance with a conditional signaling rule, wherein the current video block is disabled from using an intra sub-block partitioning (ISP) split mode which divides the current video block vertically or horizontally into multiple sub-blocks depending on dimensions of the current video block, wherein, in a case that the conversion is associated with disabling use of the ISP split mode, the conditional signaling rule specifies selectively including in the bitstream representation a first syntax element indicating that a luma component of a sub-block of the current video block includes non-zero coefficient values, and further wherein the selectively including is based at least on one or more other syntax elements having non-zero coefficient values of one or more previous sub-blocks included in the bitstream representation.

Some embodiments of the present disclosure are now discussed in clause-based format.

1. A visual media processing method, comprising:
performing a conversion between a current video block of a visual media data and a bitstream representation of the visual media data in accordance with a conditional signaling rule, wherein the current video block is disabled from using an intra sub-block partitioning (ISP) split mode which divides the current video block vertically or horizontally into multiple sub-blocks depending on dimensions of the current video block, wherein, in a case that the conversion is associated with disabling use of the ISP split mode, the conditional signaling rule specifies selectively including in the bitstream representation a first syntax element indicating that a luma component of a sub-block of the current video block includes non-zero coefficient values, and further wherein the selectively including is based at least on one or more other syntax elements having non-zero coefficient values of one or more previous sub-blocks included in the bitstream representation.

In some embodiments, alternatively, the current video block is enabled to use an intra sub-block partitioning (ISP) split mode which divides the current video block vertically or horizontally into multiple sub-blocks depending on dimensions of the current video block, wherein, in a case that the conversion is associated with enabling use of the ISP split mode, the conditional signaling rule specifies selectively including in the bitstream representation a first syntax element indicating that a luma component of a sub-block of the current video block includes non-zero coefficient values, and further wherein the selectively including is based at least on one or more other syntax elements having non-zero coefficient values of one or more previous sub-blocks included in the bitstream representation.

2. The method of clause 1, wherein the first syntax element is a luma-root CBF having a value of 1, further comprising:
in response to determining that each of the one or more other syntax elements included in the bitstream representation is zero, excluding the first syntax element from the bitstream representation, wherein the first syntax element is associated with a last sub-block of the current video block.

3. The method of any one or more of clauses 1-2, wherein in a case that the first syntax element is excluded from the bitstream representation, a value of the first syntax element is inferred.

4. The method of clause 3, wherein the value of the first syntax element is inferred as 1.

5. The method of any one or more of clauses 1-4, wherein the first syntax element is a luma-root CBF having a fixed value.

6. The method of clause 5, wherein the fixed value is 1.

7. The method of any one or more of clauses 1-6, further comprising:
making a determination that a dual-tree partitioning structure is applied to the current video block.

8. The method of any one or more of clauses 1-7, wherein the selectively including of the first syntax element in the bitstream representation is further based on the dimensions of the current video block.

9. The method of clause 8, wherein the current video block is subjected to a sub-block transform (SBT) for coding a portion of the current video block, and wherein a width and a height of the current block are not greater than a width and a height of a maximum transform size associated with the SBT.

10. The method of any one or more of clauses 1-9, wherein the first syntax element is a luma coded block flag (luma-CBF) and the one or more other syntax elements are luma-CBFs of the one or more previous sub-blocks.

11. The method of any one or more of clauses 1-10, wherein the ISP split mode results in division of the current video block into 2 or 4 sub-blocks.

12. The method of clause 1, wherein a plurality of first syntax elements are associated with the current video block, and wherein, in a case that use of the ISP mode is disabled, all syntax elements in the plurality of syntax elements associated with the current video block are zero.

13. The method of clause 1, wherein, in a case that use of the ISP mode is enabled, the selectively including the first syntax element does not depend on the one or more other syntax elements of the one or more previous sub-blocks included in the bitstream representation.

14. The method of any one or more of clauses 1-13, wherein in a case that the first syntax is excluded in the bitstream representation, the current video block meets one or more constraints on size.

15. The method of any one or more of clauses 1-14, wherein the first syntax element is a coded block flag (CBF) associated with a chroma component of the current video block, and the one or more other syntax elements are chroma CBFs of the one or more previous sub-blocks.

16. The method of clause 15, wherein the CBF comprises a Cx CBF and a Cy CBF.

17. The method of clause 16, wherein Cx-CBF is Cb-CBF and Cy-CBF is Cr-CBF.

18. The method of clause 16, wherein Cx-CBF is Cr-CBF and Cy-CBF is Cb-CBF.

19. The method of clause 15, wherein the CBF is associated with a last sub-block of the current video block.

20. The method of any one or more of clauses 15-19, wherein in a case that the CBF is excluded from the bitstream representation, a value of the CBF is inferred.

21. The method of clause 20, wherein the value of the CBF is inferred as 1.

22. The method of any one or more of clauses 15-21, wherein the CBF is a chroma-root CBF having a fixed value.

23. The method of clause 22, wherein the fixed value is 1.

24. The method of any one or more of clauses 15-23, further comprising:
making a determination that a dual-tree partitioning structure is applied to the current video block.

25. The method of any one or more of clauses 15-24, wherein the selectively including of the first syntax element in the bitstream representation is further based on the dimensions of the current video block.

26. The method of clause 25, wherein the current video block is subjected to a sub-block transform (SBT) for coding a portion of the current video block, and wherein a width and a height of the current block are not greater than a width and a height of a maximum transform size associated with the SBT.

27. The method of any of clauses 1-26, wherein the conversion includes generating the bitstream representation from the current video block.

28. The method of any of clauses 1-26, wherein the conversion includes generating pixel values of the current video block from the bitstream representation.

29. The method of any of clauses 1-26, wherein the current video block is a coding unit (CU) or a transform unit (TU) of a rectangular region of video data.

30. A video processing apparatus comprising a processor configured to implement a method recited in any one or more of clauses 1-26.

31. A video encoding apparatus comprising a processor configured to implement a method recited in any one or more of clauses 1-26.

32. A video decoding apparatus comprising a processor configured to implement a method recited in any one or more of clauses 1-26.

33. A computer readable medium having code stored thereon, the code, upon execution, causing a processor to implement a method recited in any one or more of clauses 1-26.

From the foregoing, it will be appreciated that specific embodiments of the presently disclosed technology have been described herein for purposes of illustration, but that various modifications may be made without deviating from the scope of the disclosure. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any embodiment or of what may be claimed, but rather as descriptions of features that may be specific to particular embodiments of particular disclosures. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
   determining, for a first conversion between a first video block of a video and a bitstream of the video, a first indication, wherein the first video block is coded using an inter mode;
   inferring, in response to the first indication indicating the first video block being divided into multiple first sub-blocks, a second indication for at least one first sub-block, wherein the second indication is not included in the bitstream and is inferred to indicate whether a luma component of a corresponding first sub-block includes non-zero coefficient values; and
   performing the first conversion at least based on the second indication.

2. The method of claim 1, wherein the multiple first sub-blocks comprise two first sub-blocks, wherein the second indication for one of the two first sub-blocks is derived to indicate that a luma component includes non-zero coefficient values, the second indication for another of the first two sub-blocks is derived to indicate that a luma component does not include non-zero coefficient values.

3. The method of claim 1, wherein the second indication is inferred to 1 to indicate that the luma component of the corresponding first sub-block includes non-zero coefficient values.

4. The method of claim 1, wherein the method further comprises:
   determining, for a second conversion between a second video block of the video and the bitstream of the video, a third indication, wherein the second video block is coded using an intra mode;
   determining, in response to the third indication indicating the second video block being divided into multiple second sub-blocks, a fourth indication for each second sub-block, wherein whether the fourth indication for one of the multiple second sub-blocks is included in the bitstream is based on values of the fourth indications for other ones of the multiple second sub-blocks included in the bitstream; and
   performing the second conversion at least based on the fourth indication.

5. The method of claim 4, wherein the second indication for last one of the multiple second sub-blocks is not included in the bitstream in response to the second indication for previous ones of the multiple second sub-blocks indicating the luma component does not include non-zero coefficient values.

6. The method of claim 5, wherein the second indication for last one of the multiple second sub-blocks is derived to indicate that the luma component includes non-zero coefficient values.

7. The method of claim 6, wherein the second indication for last one of the multiple second sub-blocks is inferred to 1, to indicates that the luma component of the last one of the multiple second sub-blocks includes non-zero coefficient values.

8. The method of claim 4, wherein a size of the second video block is indicated by M*N, M and N indicates a width and a height of the second video block separately, and
   wherein in response to M=4 N=8 or M=8 N=4, the second video block is divided into 2 second sub-blocks, or
   wherein in response to a product of M and N being greater than 32, the second video block is divided into 4 second sub-blocks.

9. The method of claim 4, wherein all the second sub-blocks share a same intra mode.

10. The method of claim 1, wherein the first conversion comprises encoding the first video block into the bitstream.

11. The method of claim 1, wherein the first conversion comprises decoding the first video block from the bitstream.

12. An apparatus for processing video data comprising a processor and a non-transitory memory with instructions thereon, wherein the instructions upon execution by the processor, cause the processor to:
   determine, for a first conversion between a first video block of a video and a bitstream of the video, a first indication, wherein the first video block is coded using an inter mode;
   infer, in response to the first indication indicating the first video block being divided into multiple first sub-blocks, a second indication for at least one first sub-block, wherein the second indication is not included in the bitstream and is inferred to indicate whether a luma component of a corresponding first sub-block includes non-zero coefficient values; and
   perform the first conversion at least based on the second indication.

13. The apparatus of claim 12, wherein the multiple first sub-blocks comprise two first sub-blocks, wherein the second indication for one of the two first sub-blocks is derived to indicate that a luma component includes non-zero coefficient values, the second indication for another of the first two sub-blocks is derived to indicate that a luma component does not include non-zero coefficient values.

14. The apparatus of claim 12, wherein the second indication is inferred to 1 to indicate that the luma component of the corresponding first sub-block includes non-zero coefficient values.

15. The apparatus of claim 12, wherein the instructions upon execution by the processor, further cause the processor to:
   determine, for a second conversion between a second video block of the video and the bitstream of the video, a third indication, wherein the second video block is coded using an intra mode;
   determine, in response to the third indication indicating the second video block being divided into multiple second sub-blocks, a fourth indication for each second sub-block, wherein whether the fourth indication for one of the multiple second sub-blocks is included in the bitstream is based on values of the fourth indications for other ones of the multiple second sub-blocks included in the bitstream; and
   perform the second conversion at least based on the fourth indication.

16. The apparatus of claim 15, wherein the second indication for last one of the multiple second sub-blocks is not included in the bitstream in response to the second indication for previous ones of the multiple second sub-blocks indicating the luma component does not include non-zero coefficient values.

17. The apparatus of claim 16, wherein the second indication for last one of the multiple second sub-blocks is derived to indicate that the luma component includes non-zero coefficient values.

18. The apparatus of claim 17, wherein the second indication for last one of the multiple second sub-blocks is inferred to 1, to indicates that the luma component of the last one of the multiple second sub-blocks includes non-zero coefficient values.

19. A non-transitory computer-readable storage medium storing instructions that cause a processor to:
- determine, for a first conversion between a first video block of a video and a bitstream of the video, a first indication, wherein the first video block is coded using an inter mode;
- infer, in response to the first indication indicating the first video block being divided into multiple first sub-blocks, a second indication for at least one first sub-block, wherein the second indication is not included in the bitstream and is inferred to indicate whether a luma component of a corresponding first sub-block includes non-zero coefficient values; and
- perform the first conversion at least based on the second indication.

20. A method for storing a bitstream of a video, comprising:
- determining a first indication for a first video block of a video, wherein the first video block is coded using an inter mode;
- inferring, in response to the first indication indicating the first video block being divided into multiple first sub-blocks, a second indication for at least one first sub-block, wherein the second indication is not included in the bitstream and is inferred to indicate whether a luma component of a corresponding first sub-block includes non-zero coefficient values;
- generating the bitstream at least based on the second indication; and
- storing the bitstream in a non-transitory computer-readable recording medium.

* * * * *